United States Patent [19]

Filliman et al.

[11] Patent Number: 4,656,662
[45] Date of Patent: Apr. 7, 1987

[54] PERSONAL IDENTIFICATION METHOD AND APPARATUS

[75] Inventors: Mark D. Filliman, Beavercreek; Robert H. Granzow, Miamisburg, both of Ohio

[73] Assignee: NCR Corporation, Dayton, Ohio

[21] Appl. No.: 514,992

[22] Filed: Jul. 18, 1983

[51] Int. Cl.⁴ .............................. G06K 9/00
[52] U.S. Cl. ......................... 382/3; 382/66; 340/707; 340/708
[58] Field of Search ...................... 340/707, 705, 708; 382/3, 13, 59, 66; 434/307, 323, 337

[56] References Cited

U.S. PATENT DOCUMENTS

| | | | |
|---|---|---|---|
| 3,576,574 | 4/1971 | Baskin et al. | 340/324 |
| 3,651,508 | 3/1972 | Scarborough, Jr. et al. | 340/707 |
| 3,760,373 | 9/1973 | Bartz | 340/172.5 |
| 3,761,877 | 9/1973 | Fernald | 340/146.3 SY |
| 3,962,679 | 6/1976 | Engelbrecht | 340/146.3 SY |
| 4,112,415 | 9/1978 | Hilbrink | 340/146.3 SY |
| 4,146,880 | 3/1979 | Arizabalaga | 340/707 |
| 4,224,614 | 9/1980 | DevChoudhury | 340/707 |
| 4,308,522 | 12/1981 | Paganini et al. | 340/146.3 SY |
| 4,377,810 | 3/1983 | Wolff | 340/707 |
| 4,454,417 | 1/1984 | May | 340/707 |

FOREIGN PATENT DOCUMENTS 2089180 6/1982 United Kingdom .

OTHER PUBLICATIONS

Dr. Dobb's Journal, No. 74, Dec. 1982, Marek W. Michalski, "A Simple Vector Generation Algorithm", p. 58.

"Light Pen Aids User Interaction with Display", F. J. Porter, *Hewlett-Packard Journal*, vol. 31, No. 12, Dec. 1980.

"Graphical Computer Input", K. C. Konnerth, *IBM Technical Disclosure Bulletin*, vol. 12, No. 11, Apr. 1970.

"A Light Pen for Microcomputers", M. Sheperd, *Wireless World*, vol. 88, No. 1558, Jul. 1982.

"Form Identification Overlay", P. F. Evans, *Xerox Disclosure Journal*, vol. 1, Nos. 9 & 10, Sep. & Oct. 1976.

Primary Examiner—Leo H. Boudreau
Assistant Examiner—Jose L. Couso
Attorney, Agent, or Firm—Albert L. Sessler, Jr.

[57] ABSTRACT

A method and apparatus for personal identification employ the combination of a CRT and a light pen for the generation of a signature or other identification indicia by movement of the light pen on the CRT screen. Positional information is captured from the screen by the light pen and is compressed and collected to form a signature or other indicia representation which can be stored and subsequently used as a reference for identification purposes. High resolution means are employed to provide precise positional data. If desired, a visible path may be generated on the CRT screen representing the movement of the light pen as the signature or other indicia is produced. Also, if desired, a signature or other identifying indicia may be produced at a location remote from the CRT on a suitable record medium, such as a one-time carbon, and later traced on the CRT screen by the light pen.

12 Claims, 7 Drawing Figures

PERSONAL IDENTIFICATION METHOD AND APPARATUS

BACKGROUND OF THE INVENTION

Many instances arise, in various types of financial, governmental, retail, manufacturing and other establishments, in which signatures or other written indicia on various types of documents must be compared to a reference signature or other reference indicium in order to establish the identity of a person, or the genuineness of a document. Consequently, a need exists for a relatively quick and inexpensive means for recording a reference signature or other indicia in such a way that it can be stored, and rapidly and efficiently recalled and displayed, as for example on a CRT.

SUMMARY OF THE INVENTION

This invention relates to a personal identification method and apparatus, and more particularly relates to such method and apparatus in which a reference signature or other identifying indicia may be generated and stored by controlled movement of a recording instrument over a display device in a unique pattern.

In accordance with a first embodiment of the invention, a method for personal identification comprises the steps of providing a display device for use in recording of identification data; providing a recording instrument for receiving positional data from said display device; moving said recording instrument over said display device in a unique pattern; providing both coarse and fine positional information to provide precise positional information; averaging a plurality of items of precise positional information which have been generated with the recording instrument in a single position to produce a single averaged item of positional information; collecting and compressing a plurality of said averaged items of positional information to provide a mathematical representation of movement of the recording instrument with respect to the display device; and storing said compressed plurality of averaged items of positional information to provide a reference by which the person moving the recording instrument with respect to the display device may be identified.

In accordance with a second embodiment, personal identification apparatus comprises display means in which a controllable repetitive pattern of illumination is produced on a screen; detection means capable of detecting said illumination when brought into proximity to said screen by a strobe signal generated at predetermined times; controller means for controlling the generation of said pattern on the screen of the display means, coupled to the detection means to receive said strobe signal for providing coarse positional information as to the location of the detection means on the screen; high-resolution counting means controlled by said controller means and coupled to the detection means to receive said strobe signal for providing fine positional information as to the location of the detection means on the screen; and data processing means for combining the coarse and fine positional information to provide precise positional information as to the location of the detection means on the screen, said data processing means also averaging a plurality of items of positional information generated with said detection means in a single position in order to provide a single averaged datum for that position.

In accordance with a third embodiment, a method for personal identification comprises the steps of providing a display device for use in recording of identification indicia; providing recording means which includes high resolution means for receiving positional data from a display device; recording a unique pattern of personal identification data remotely from said display device on a separate element and subsequently recording by placing said element on said display device and tracing the path of the recording with said recording means, said recording means picking up high-reslution positional data from said display device during said movement; and storing said high resolution positional data for reference.

It is accordingly an object of the present invention to provide an improved personal identification method and apparatus.

Another object is to provide a method and apparatus for personal identification employing the combination of a display device and a recording instrument.

Another object is to provide a method and apparatus for personal identification employing the combination of a CRT and a light pen.

Another object is to provide a method and apparatus for personal identification employing the combination of a display device and recording means which includes high resolution detection means for enabling precise positional data to be captured from the display device.

With these and other objects, which will become apparent from the following description, in view, the invention includes certain novel features of construction and combinations of parts, one form or embodiment of which is hereinafter described with reference to the drawings which accompany and form a part of this specification.

DESCRIPTION OF THE PREFERRED EMBODIMENT

Figure 1:
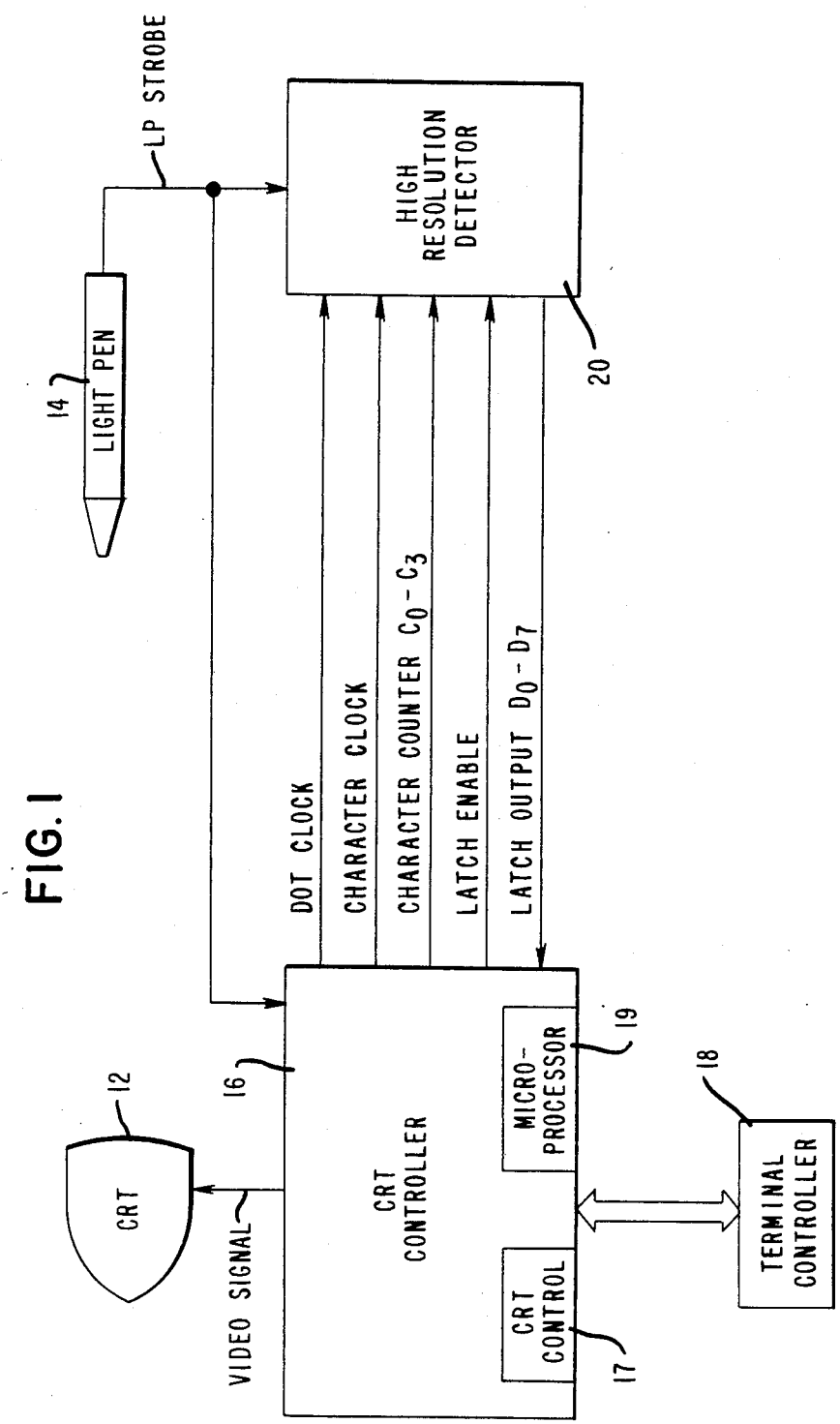
FIG. 1 is a block diagram showing the hardware components of the personal identification system of the present invention.

Referring now to the drawings, an illustrated embodiment of the personal identification system of the present invention is shown in block form in FIG. 1. This system comprises a display device 12, which may be a cathode ray tube terminal (CRT) such as an NCR Model M190, manufactured by NCR Corporation, Dayton, Ohio; a recording instrument 14, which may be a light pen, such as a Model LP-710 manufactured by Information Control Corporation, Los Angeles, Calif.; a terminal 16 for controlling the CRT 12; a terminal controller 18, and a unique high-resolution detector 20.

The terminal 16 may be any one of a wide variety of types, such as, for example, a financial teller terminal which is capable of performing a number of different types of financial transactions. For purposes of the present invention, such a terminal would include a CRT control device 17, such as a Motorola 6845 semiconductor device, manufactured by Motoroal Inc., Phoenix, Ariz., for controlling the CRT 12, and a microprocessor 19, such as an Intel 8085 semiconductor device, manufactured by Intel Corporation, Santa Clara, Calif., for exercising system operation control under programs to be subsequently described.

The high resolution detector 20 extends the resolution of the light pen detection system of a standard CRT controller, which can normally only detect the position of a light pen on a CRT screen within one CRT scan line vertically, and within one character position horizontally. For a standard CRT, this gives a vertical resolution of 350 scan lines and a horizontal resolution of 80 characters. This degree of horizontal resolution is not adequate for the capture of data for an identification signature or other identifying indicia.

The high resolution detector 20 enables the position of the light pen 14 to be detected within one dot horizontally. Assuming 8 dots per character, as in the illustrated embodiment, this increases the horizontal resolution from 80 positions to 640. Other numbers of dots per character (such as 9 dots, which would give horizontal resolution of 720 positions per line) may be employed if desired, but a value of 8 dots per character simplifies certain aspects of the system, such as the data compression algorithm.

Figure 2:
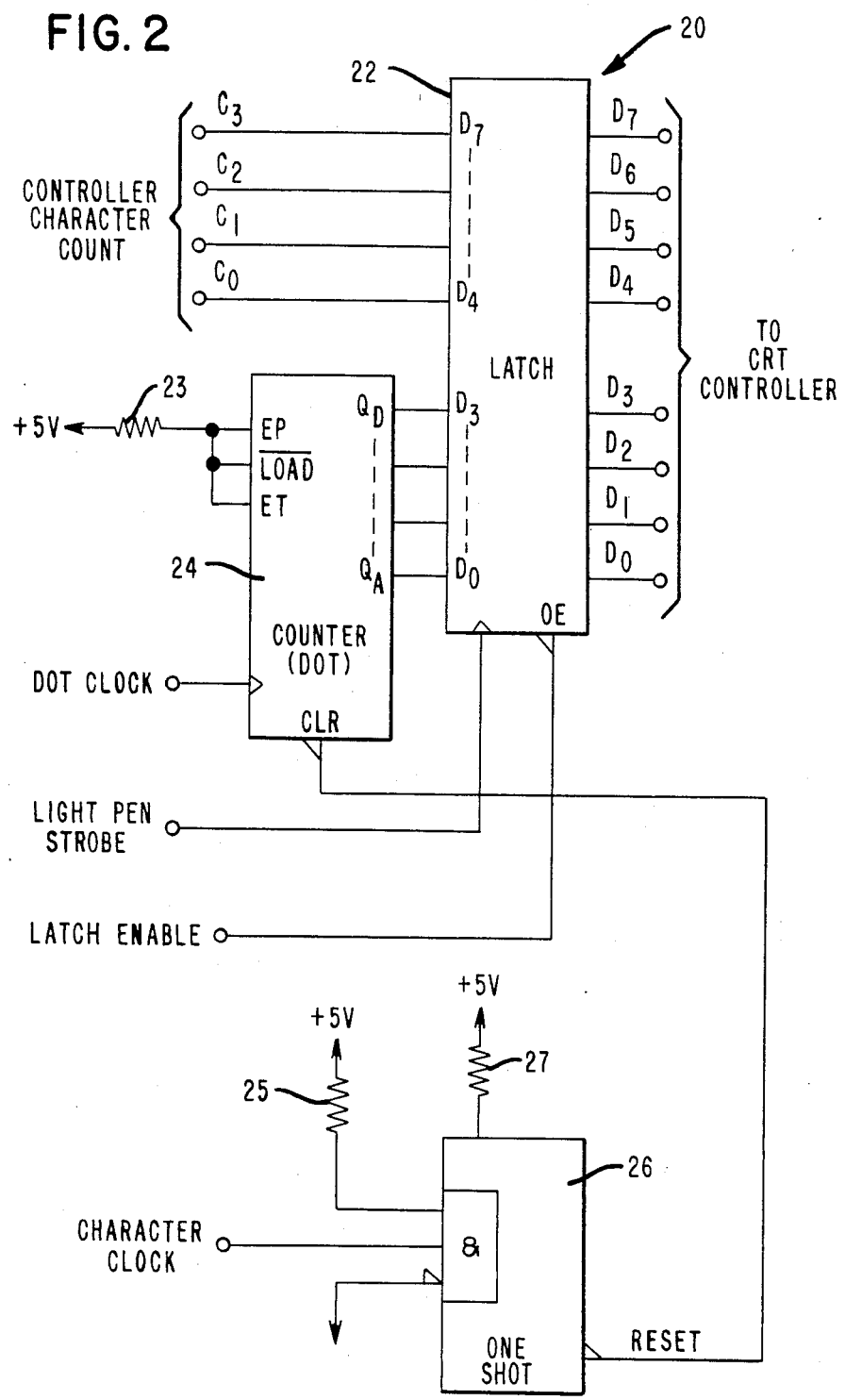
FIG. 2 is a schematic diagram of the high-resolution detector of the present invention.

Referring now to FIG. 2, the high resolution detector 20 includes a latch 22, which may be of type SN74LS374, manufactured by Texas Instruments Inc., Dallas, Tex.; a dot counter 24, which may be of type SN74LS161, also manufactured by Texas Instruments Inc., and a reset pulse generator 26, which may be of type SN74LS221, manufactured by Texas Instruments Inc.

Figure 3:
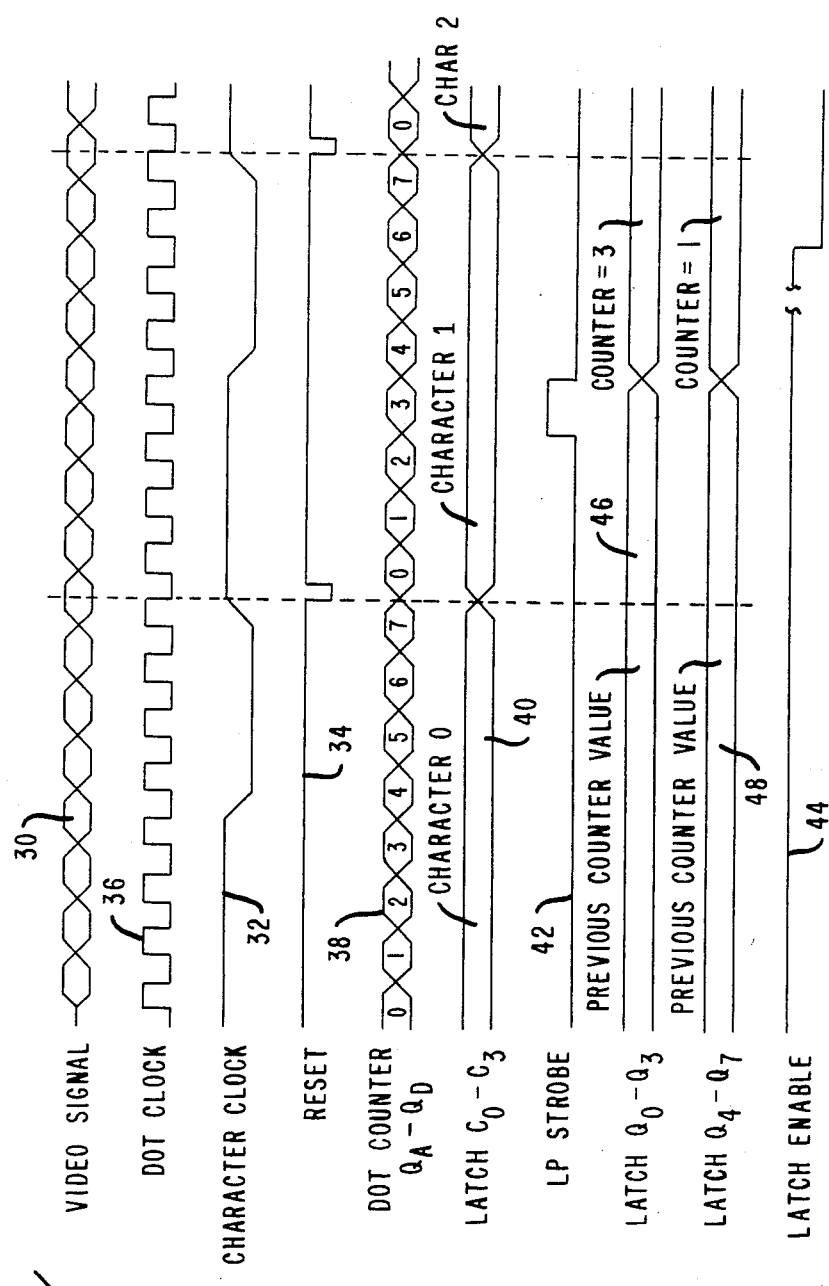
FIG. 3 is a timing diagram showing the waveforms and relationships of various signals associated with the system of FIG. 1.

The operation of the system of FIG. 1 is based upon the operation of a standard CRT 12 and CRT controller 16, and will now be explained. Reference may be had to the waveforms of FIG. 3 for understanding of the relationships of the various signals.

During operation, the CRT 12 receives a video signal 30 from the CRT controller terminal 16. This signal instructs the CRT 12 to turn on and off each dot in each horizontal line on the screen of CRT 12. The terminal 16 generates the video signal by means of an internal dot clock (not shown) which clocks once for each dot signal sent to the CRT 12 in the video signal 30. Also included in the terminal 16 is a character clock (not shown) which maintains a character count, each character being represented by eight dots of a horizontal line.

The internal character clock generates a character clock signal 32 which changes logic levels at the end of each 8 dot count. This signal is applied to one input of an integral AND gate in the reset pulse generator 26. A second input to the AND gate is connected over a 10K ohm resistor 25 to a plus 5-volt source of potential, and a third input to said AND gate is connected to a base reference potential, shown as ground. An additional input VCC of the reset pulse generator 26 is connected over a 10K ohm resistor 27 to a plus 5-volt source of potential.

The character clock signal 32 causes the reset pulse generator 26 to generate a reset signal 34 from its Q output which is applied to the reset terminal of the dot counter 24, to cause said dot counter to be reset at the end of each character.

The dot counter 24 also receives dot clock signals 36 from the internal dot clock in the terminal 16 and maintains a count of the number of dot clocks that have occurred within one character. The counter output signal 38 on lines $Q_A$-$Q_D$ inclusive extending between dot counter 24 and latch 22 indicate which specific dot is currently being displayed on the screen of the CRT 12. When the dot counter 24 reaches the last dot in the character, it is reset, as described above, by the reset signal 34 from the reset pulse generator 26, and begins counting dots for the next character. The EP, LOAD and ET inputs of the dot counter 24 are connected together and over a 10K ohm resistor 23 to a plus 5-volt source of potential.

Inputs to the latch 22 include the signal 38 on lines $Q_A$-$Q_D$ from the dot counter 24, a signal 40 on lines $C_0$-$C_3$ from the terminal 16, representing the character position on the CRT display line, a light pen strobe signal 42 and a read count or latch enable signal 44. The latch enable signal 44 is not drawn to the same time scale as the remaining signals in FIG. 3. Outputs from the latch 22 include the dot position signals 46 on lines D0-D3 and the lower four bits of the character position signals 48 on lines D4-D7.

The latch 22 functions to store the current dot position when the light strobe signal 42 is applied to said latch. At such time, the latch 22 captures the value of the dot counter 24 and the low four bits of the character counter in the terminal 16.

A program for converting the above-described data into information representing the instantaneous position of the light pen on the screen of the CRT 12 controls the processing of real-time data from the light pen 14 and the high resolution detector 22. It is stored in the terminal 16 and operates the microprocessor 19 contained therein. This program is shown in the flow diagrams of FIGS. 6 and 7. A program listing is appended hereto.

Figure 4:
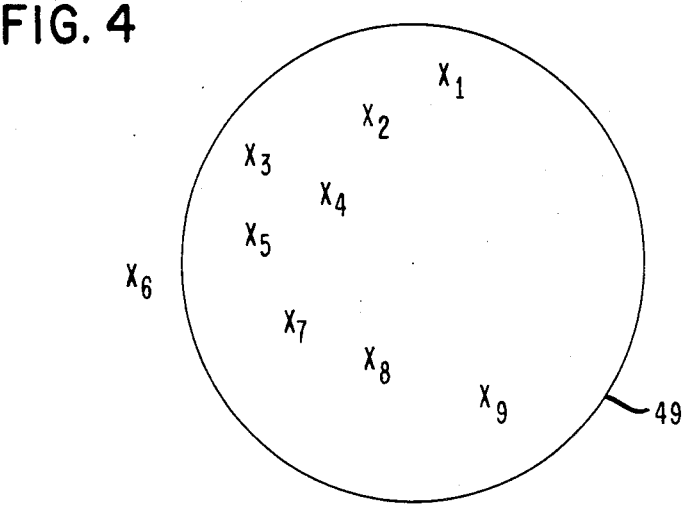
FIG. 4 shows a representative sample of data points seen by a light pen on a CRT screen.

As shown in FIG. 4, the real-time data which is captured by the hardware comprises a "burst" of about nine points or dots on successive lines of the screen of the CRT 12 where the light pen 14 has detected an energized phosphor dot. This burst is repeated each time that the entire CRT screen is refreshed in normal operation. It will be noted that the individual points X1-X9 inclusive of FIG. 4 are in a generally semicircular configuration, corresponding to the leading edge circumference of the circular detection area 49 of the light pen 14. The data captured for each of these points appears in Table 1 below, together with additional information developed therefrom, as will subsequently be explained in greater detail.

TABLE 1

| | SAMPLE DATA FROM ONE BURST (HEXADECIMAL) | | | | | |
|---|---|---|---|---|---|---|
| POINT | CONTROLLER CHARACTER COUNT | DETECTOR CHARACTER COUNT | DOT COUNT | COMBINED COUNT | ROW | COLUMN |
| X1 | 0010 | E | 0 | 000E0 | 0 | E0 |
| X2 | 005F | D | 6 | 005D6 | 1 | D6 |
| X3 | 00AF | D | 3 | 00AD3 | 2 | D3 |
| X4 | 00FF | D | 5 | 00FD5 | 3 | D5 |
| X5 | 014F | D | 3 | 014D3 | 4 | D3 |
| X6 | 019F | D | 0 | 019D0 | 5 | D0 |
| X7 | 01EF | D | 4 | 01ED4 | 6 | D4 |
| X8 | 023F | D | 6 | 023D6 | 7 | D6 |
| X9 | 0290 | E | 1 | 028E1 | 8 | E1 |

Figure 6:
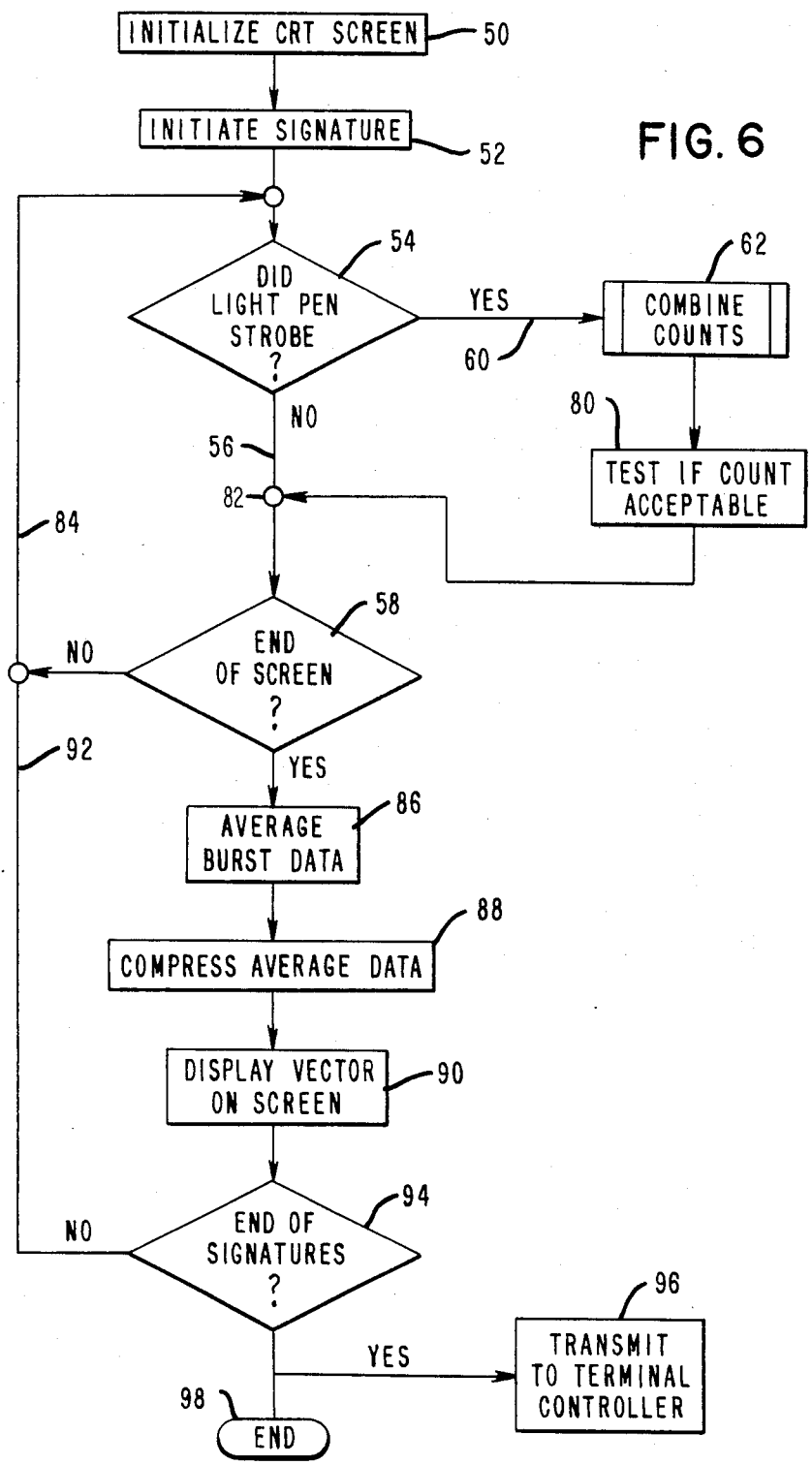
FIG. 6 is a flow diagram showing the process for generating data representative of reference indicia from information produced in the course of recording the signature or other indicia.

Referring now to FIG. 6, the program first initializes the CRT screen and controls therefor, as represented in block 50, to provide a stable CRT display with the full screen illuminated. The recording of indicia such as a signature is normally initiated, as represented in block 52, by pressing the light pen 14 against the screen to energize a pressure-responsive switch, or some other suitable control means.

The process continues as represented in decision block 54, by determining whether or not the light pen 14 has generated a strobe signal 42. When the light pen 14 detects an illuminated dot on the CRT screen, the strobe line generates a strobe signal 42 to cause the character count and the dot count for that individual dot to be latched in the latch 22 of the high resolution detector 20.

If no such signal has been generated, the process continues along branch 56 with the pen continuing to move on the screen until the end of the screen is reached, as represented by decision block 58.

Figure 7:
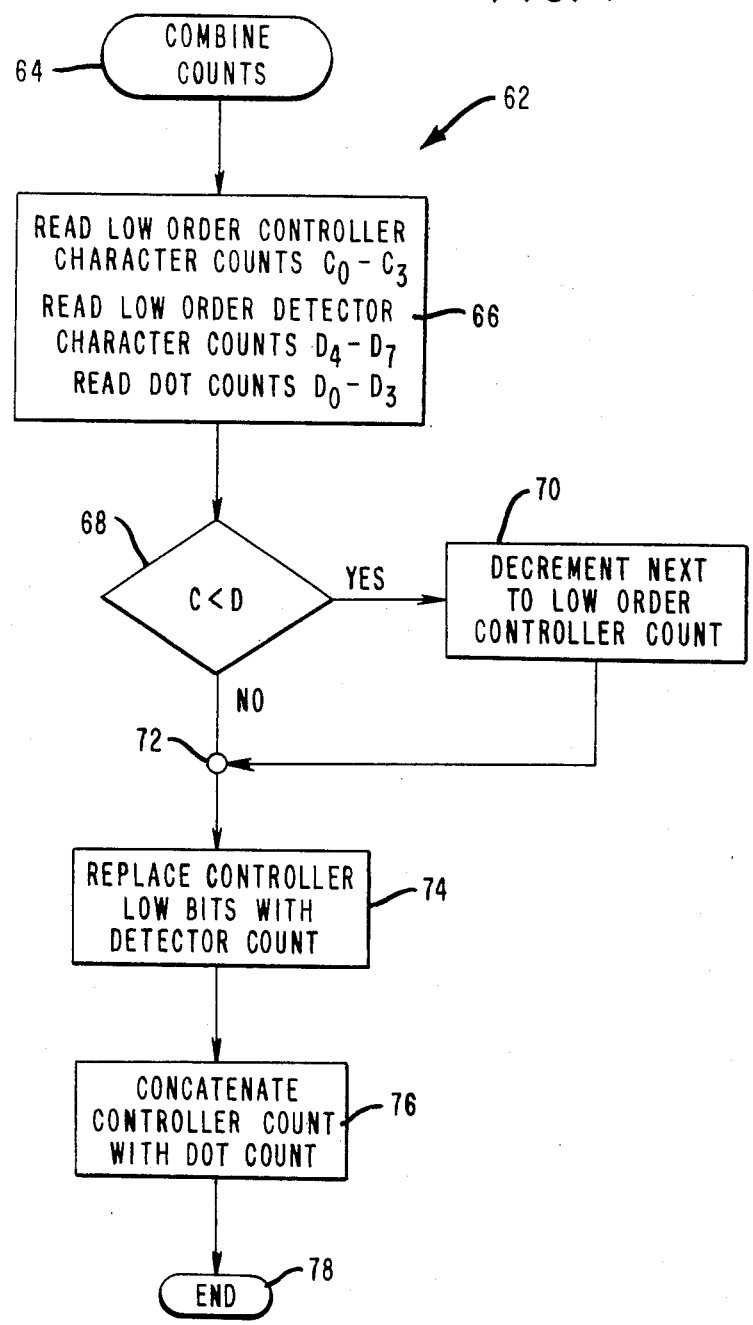
FIG. 7 is a flow diagram of the count combining subroutine which forms part of the process shown in FIG. 6.

However, if a light pen strobe signal is detected, the process continues on branch 60 to the "combine counts" subroutine which is represented in FIG. 6 by block 62, and which is shown in greater detail in FIG. 7, where a block 64 represents initiation of the "combine counts" subroutine.

As shown in block 66, the four low order bits C0–C3 of the controller count C, on lines C15–C0, taken from the terminal 16, are read and placed in an appropriate storage location associated with the microprocessor 19, contained in the terminal 16. In addition, the four low order bits D4–D7 inclusive of the character count are taken from the latch 22 of the high resolution detector 20 and are read and placed in a second storage location associated with the microprocessor 19. Also the four bits D0–D3 inclusive representing the dot count are read and placed in a third storage location.

It may be useful at this point to refer to Table 1 above, and to note that the character and dot values therein are expressed in hexadecimal notation. It may also be noted that due to the delay inherent in the CRT controller character counter, the CRT controller character count C is usually two counts later, and therefore grater in magnitude, than the detector character count D, which is in time with the corresponding detector dot count. Therefore, the subroutine of FIG. 7 must normally perform a corrective operation on the character count and then combine it with the dot count in order to produce the desired high resolution data which gives the precise location of the dot on the CRT screen which is currently being detected by the light pen 14.

To illustrate, reference may be had, for example, to point X3 in Table 1. The controller character count for X3 is 00AF (in hexadecimal notation). However, the low order (lines D4–D7 inclusive) character count from the detector 20 is "D", which is two counts, or bits, lower than the low order count (F) of the controller character count, due to the system delay, as mentioned above. Thus, the detector low order count "D" should be substituted for the controller character low order count "F" in order to correct the count. After this has been done, the dot count "3" is combined with the corrected character count in order to produce the "combined count" of "00AD3". This then can be translated by a look-up table or other suitable means to the row and column values of "2" and "D3" shown in the table to enable precise location of the dot on the CRT screen.

The point X9 of Table 1 offers another example, in which the controller character count is 0290 (in hexadecimal notation), and in which the low order character count from the detector 20 is "E", which is fifteen counts higher than the low order count "0" of the controller character count. In this instance, in order to correct the controller character count, it is necessary to decrement the next-to-low order of the controller character count by one before substituting the low order detector character count "E" for the low order controller character count "0", and then combining this with the dot count "1" to produce the "combined count" of "028E1", which corresponds to the row and column values of "8" and "E1", respectively.

The process described above is represented in FIG. 7 by a continuation of the process from block 66, to the decision block 68, in which a comparison is made as to whether low order controller character count C is less than low order detector character count D. If so, then the next-to-low order of controller character count C must be decremented by one count, as represented in block 70, and as described above in connection with the dot X9. The process then continues to node 72.

If D is not greater than C, the process moves directly to node 72, and thereafter continues to block 74, in which the controller character count low order is replaced with the detector character count low order, as is also described above in connection with Table 1.

Following this, the process continues to block 76, in which the dot count is combined or concatenated with the corrected character count to produce the desired combined count. This ends the subroutine (block 78).

The continuation of the process is found in FIG. 6, in which a test is next made, as represented in block 80, to determine whether or not a given count is acceptable; that is, whether it is within defined parameters, and therefore presumed not to be the result of a spurious reading. In the illustrated embodiment of the invention, this test involves a comparison of the values for each dot with the values of the first sensed dot of the burst. If the horizontal position of the dot being tested is to the right of the first dot, or is too far to the left, then the dot being tested is not considered to be acceptable. This is consistent with the previously-described expected semicircular configuration of the dot burst. In the illustrated dot burst of FIG. 3 in Table 1, dots X6 and X9 are considered to be not acceptable.

Following the test of block 80, the process proceeds to node 82, after which a determination is made as to whether or not the end of the screen has been reached, as represented by previously-mentioned decision block 58. In the illustrated embodiment, this determination is made by using a software timer which times out after a duration equal to the time required for providing four scan lines on the CRT screen. If a light pen strobe occurs within that time period, then the process returns along branch 84 to the decision block 54.

However, if it is determined that the end of the screen has been reached, the process then compresses the various dot information which has been received, as represented by block 86, to provide a single average dot location for the burst most recently detected. If the number of acceptable points in the burst is less than four, the entire burst is ignored in the illustrated embodiment. Otherwise, the rows and columns of the acceptable points are averaged. For the values shown in Table 1, the row average value is 3 and the column average value is 5.

The next step in the process is to compress the data from the average values for each burst, as represented by block 88. The compression algorithm compares the row and column information for the current point with the row and column information for the previous point, and generates a series of short vectors between the points. One means of accomplishing this is by use of Michalski's vector generation algorithm, which is described on page 58 of the December, 1982 issue, No. 74, of Dr. Dobb's Journal.

Figure 5:
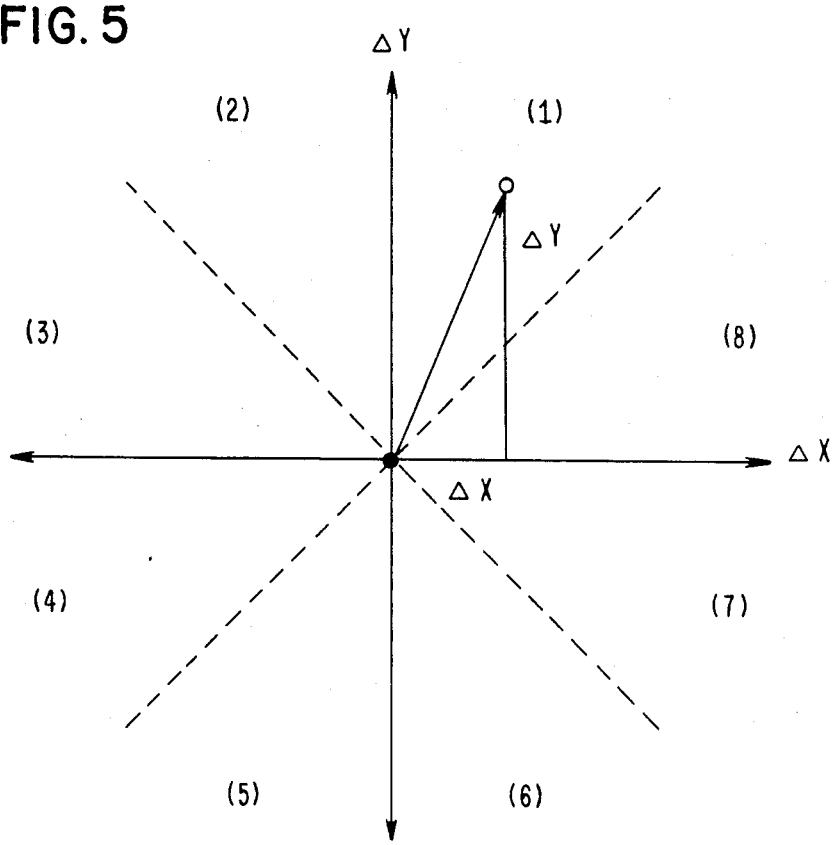
FIG. 5 is a diagram showing the manner in which data generated by the system is used to produce vectors for displaying a representation of the reference indicia.

Each of these vectors is represented by a 3 bit binary number determined by the orientation of the vector. This enables the division of an XY coordinate system into eight zones or octants, with each octant being defined by one of the available 3-bit combinations, as shown in FIG. 5. For example, if $X_i$ represents the column value, and $Y_i$ represents the row value, of a previous point; and if $X_{i+1}$ represents the column value, and $Y_{i+1}$ represents the row value, of a current point; and if $X_{i+1}$ is greater than $X_i$ and $Y_{i+1}$ is greater than $Y_i$; and if the magnitude $|X_{i+1}-X_i|$ is less than $|Y_{i+1}-Y_i|$, then the orientation of the vector from $X_i Y_i$ to $X_{i+1} Y_{i+1}$ is in octant 1 of FIG. 5.

The series of 3-bit vector orientations define the path of the light pen 14 across the screen of the CRT 12 with a relatively small amount of data. Shortening of the vector length improves the accuracy of the trace of the path. As indicated in block 90, the vector information may, if desired, be fed back to the address inputs of the CRT screen for display of the signature or other identifying indicia on the CRT screen as said information is generated by movement of the light pen across the screen.

The process continues over branch 92 until the light pen is lifted from the screen, thereby causing an appropriate switching or other action, as represented by block 94. The compressed data representing the signature or other identification indicia is then transmitted to a suitable reference storage location, as indicated by block 96, and the process ends, as represented by block 98.

If desired, the initial recording of a signature or other identifying indicia may be accomplished remotely from the screen of the CRT 12 on a separate element, such as a one-time carbon ribbon on which a substantially transparent negative image of said signature or other identifying indicia is produced by a pen or similar implement. The signature or other identifying indicia is then recorded by placing the carbon ribbon on the screen of the CRT 12 and tracing the image of the recording with the light pen 14.

A description of the operation and general content of the appended computer program listing follows. It should be noted that the CRT control device 17 used in the implementation embodied in the program listing is a Signetics vector set comprising an SCN2672 programmable video timing controller and an SCN2673 video attribute controller. It should also be noted that in the appended listing, the functions referred to as blocks 62, 66 and 80 are implemented in a slightly different manner than is shown in FIGS. 6 and 7, from a timing standpoint. Specifically, block 66 is contained in the loop from block 54 to node 82, but the remainder of the functions of block 62, as well as the functions of block 80, are performed after the end of the screen has been reached, as represented by the END OF SCREEN decision block 58, and before the function represented by the AVERAGE BURST DATA 86 is performed.

The program listing is divided into three main sections:

| | | | |
|---|---|---|---|
| 1. | Data initialization | LINES | 1 to 130 |
| 2. | Main Program | LINES | 131 to 431 |
| 2.1 | Program initialization | LINES | 131 to 220 |
| 2.2 | Control | LINES | 221 to 431 |
| 3. | Subroutines | LINES | 432 to 1452 |

DESCRIPTION OF LISTING:
1. DATA INITIALIZATION
LINES 1 to 130
Specifically, lines 18 to 68 contain all data definition for constants, lines 69 to 130 contain all data definition for variables.
2. MAIN PROGRAM
LINES 131 to 431
2.1 Program initialization
LINES 131 to 220
These lines contain a jump to the start of the program, initialization of all microprocessor 8085 interrupt vectors, and initialization of the CRT screen.

In particular, line 136 is a jump to the start of the program, lines 146 to 148 contain the interrupt service routine for an interrupt request from the SCN2672 device. This interrupt is only active during power rest.

BLOCK 50, FIG. 6: Initialize CRT screen

Lines 174 and 185 initialize the CRT screen. The screen is defined as containing 16 character per row and 128 rows. The characters are defined to be 8 bits wide by 1 bit high. 16 characters times 128 rows result in 2048 8-bit characters or 2K byte of display RAM.

The CRT screen is filled with ones in lines 181 to 185 by defining an hexadecimal character "FF", specifying "7ff" bytes (2K) and calling the BLOCK Subroutine. This results in a CRT display with full screen area illuminated.

2.2 Control program LINES 221 to 431

INTERNAL LOOP DEFINED BY BLOCKS 52, 54, 66, 80, 58 AND BACK TO 54

BLOCK 52, FIG. 6—Initiate signature

Lines 223 to 243

The recording of the signature is initiated when the first pen strobe signal is detected in line 230. If a strobe is not detected by the time the register "C" value gets to zero (register C is initialized to hexadecimal "FF" in line 225), the program loops through lines 252 to 426 where register C gets reinitialized to "FF" and back to line 228, and it stays in this loop until the first pen strobe is detected. Once the first strobe is obtained from the light pen, the software timer represented by register "C" is reset to the value of register B, which was initialized in line 226 to the value of the constant TIMOUT, which is defined in line 52 with a value of four.

Lines 221 to 243 of the program listing represent the operations necessary to achieve this loop.

BLOCK 54, FIG. 6—a decision block: Did light pen strobe?

Lines 228 to 230

The SCN2672's status register "CRSTA" is checked to see if a light pen strobe occurred; if yes, the operation goes to line 232 labeled "LPHIT" (line 60 in FIG. 6) and if no, goes to line 240 labeled "PPWAY2" (line 56 in FIG. 6).

BLOCK 66, FIG. 7—A light pen strobe has occurred

Lines 232 to 238

As mentioned above, only block 66, FIG. 7, of blocks 62 and 80 is performed in the internal loop.

The contents D0–D7 of the Detector's latch (block 22, FIG. 2) is read from PIXDAT location and stored in the memory stack, then the character position C0–C3, corresponding to position of the pen on the screen, is read from the SCN2672's address register "LPADL" and "LPADH" and stored in the next position of the memory stack. The software timer indicated by register C is reset to the value of TIMOUT.

BLOCK 58, FIG. 6—A decision block: end of screen?

Lines 240 to 243

End of screen means the completion of a CRT refresh cycle. This determination is done by testing the software timer "C"; if the contents of register "C" is zero then the end of the screen has been reached, as previously explained.

As a result of this operation the memory stack contains a set of pen positions for the last burst of data acquired. The operation continues to block 86 FIG. 6, or line 252 of the listing.

If "C" is not zero then operation return to block 54, FIG. 6, corresponding to line 228 of listing.

BLOCKS 62, 80, 86, 88, 90 and 94 of FIG. 6

Lines 247 to 431

BLOCK 62, FIG. 6—Combine counts

Line 264 and line 279—call GETDAT subroutine

The pen position data is now obtained from the stack where it was previously saved. Lines 832 to 1088 of GETDAT subroutine perform this operation. Every time this subroutine is called the following operations take place: Lines 843 to 858 of GETDAT subroutine copy the pen position from the stack to Registers E and D (character position) and to register A (Detector's latch value).

Lines 859 to 873 represent block 68, FIG. 7, where controller character bits C0–C3 are compared with the corresponding Detector latch D4–D7.

Lines 875 to 880 of GETDAT subroutine represent block 70, FIG. 7, where the low order controller count is decremented in line 876.

Lines 882 to 885 in GETDAT subroutine represent block 74, FIG. 7, where the Detector's latch bits D4–D7 are replaced by controller character bits C0–C3.

Lines 886 to 909 of GETDAT subroutine represent block 76, FIG. 7, where the controller count and bits D0–D3 are combined and returned in registers H and L.

BLOCK 80, FIG. 6—Test if count is acceptable.}

Lines 399 to 400

This operation compares HITCNT to HITMIN. In Line 57 the value of 4 was assigned to HITMIN. If the number of points is less than four the set of points is discarded.

BLOCK 86, FIG. 6—Average burst data

This block also checks for the following conditions:
1. Lines 252 to 256. No data during this refresh cycle.
2. Lines 257 to 258. Too much data.
3. Lines 284–300, 316–333, and 354–371. Test if count acceptable.

These lines perform the functions described previously in the specification.

4. Lines 247 to 431. Normal data, compute average.

When a number of dot locations for the burst recently detected are accepted, they are averaged into a single dot position by accumulating the positions of these points in a 3-byte variable called SUM, and keeping a count of the number of dot locations within the burst in the variable HITCNT.

Lines 267, 271, 304, 311, 337, 344, 376, and 383 perform this operation.

Line 409; the value in SUM is divided by the value in HITCNT by calling the subroutine DIV24 (24 bits divide); the resultant value is the average value and is found in registers B and C.

BLOCK 88, FIG. 6—Compress average data.

Line 416—Call to DRAW subroutine.

This procedure is implemented in the subroutine DRAW (lines 445 to 661). Specifically lines 555 to 597 compute the octant and increment vector value. These values are not saved; they are used to draw the signature on the screen.

BLOCK 90, FIG. 6—Display vector on screen.

Lines 411 to 416

This operation is performed in lines 411 to 416, where the average value obtained from block 86, FIG. 6, is added to the offset values ROWOFF AND PIXOFF, and the DRAW subroutine (lines 445 to 661) is called. This subroutine draws a vector from the previous average position to the present average position. The drawing is done by clearing the pixels on the screen between this two points.

BLOCK 94, FIG. 6—End of signature?

Lines 425 to 431

Once the signature is completed the operation stays in a loop back to block 54, FIG. 6, until a Reset signal is obtained. Then the operation starts again.

BLOCK 96, FIG. 6—Transmit to terminal controller

Not implemented in listing.

3. SUBROUTINES

LINES 432 TO 667

DRAW: Draw vector in the screen from a previous screen position to a present point position and it is called from main program line 416.

LINES 668 TO 713

Not used for operation

LINES 714 TO 734

RST65: Service manually generated interrupts to reinitialize the screen after a signature is completed.

LINES 735 TO 776

INICRT: Initialize CRT controller.

LINES 777 TO 796

DISPLY: Display on screen position given by HL register the character given in the accumulator.

LINES 797 TO 820

BLOCK: Display a block of characters

Repeat the character given in the accumulator from starting location given by H and L registers to the end location given by D and E registers.

LINES 821 TO 831

READY: Test the Status Register of the SCN2672 for ready condition.

LINES 823 TO 914

GETDAT: Get position data of the memory stack into registers H and L.

LINES 916 TO 982

CLRPIX: Clear a pixel on screen at location given by registers H and L.

LINES 983 TO 1012

GETRC: compute row and column values from the position contained in registers H and L.

LINES 1013 TO 1031

GETHIT: compute pen position from extended row and column given in memory locations ROW0 and BCOLS respectively.

Position is returned in registers H and L.

LINES 1032 and 1059

RLHL: Rotate the value of registers H and L by four bits to the left.

LINES 1089 TO 1121

RRHL: Rotate the value of registers H and L by four bits to the right.

LINES 1089 to 1121

Test program.

LINES 1122 TO 1192

INITB0, INITB1 AND INITB2 TABLES: used to initialize parameters of CRT controller.

LINES 1193 TO 1244

INCXTB, INCYTB, AND RATTBL: tables used to compute position vectors and angles.

LINES 1245 TO 1452

UTILITY SUBROUTINES: This area contains all the divide and multiply subroutines used in the different computations throughout the program.

While the form of the invention illustrated and described herein is particularly adapted to fulfill the objects aforesaid, it is to be understood that other and further modifications within the scope of the following claims may be made without departing from the spirit of the invention.

```
LOC  OBJ        LINE        SOURCE STATEMENT

1 ;
                  2 ;   LIGHT PEN CONTROL PROGRAM -- 8085
                  3 ;
                  4 ;       DEV:  OCT 12, 82  MF
                  5 ;
                  6 ;
                  7 ;   THIS PROGRAM CONTROLS A LIGHT PEN USING 8085 AND
                  8 ;   SIG 2672/3 CRT CONTROLLER CHIP SET.
                  9 ;       PROGRAM WILL:
                 10 ;         - LIGHT UP SCREEN
                 11 ;         - DETECT LP HITS
                 12 ;         - TURN OFF PIXEL NEAREST TO HIT
                 13 ;
                 14 ;   THIS WILL SIMULATE A SIGNATURE CAPTURE SYSTEM
                 15 ;
                 16 ;
                 17 ;********************************************
                 18 ;
                 19 ;       DATA DEFINITIONS -- CONSTANTS
                 20 ;
                 21 ;   COMMANDS TO SIG 2672:
0000             22 MASRST  EQU    0
0010             23 LODIRP  EQU    10H       ;LOAD IR POINTER (ADD REG #)
0022             24 DISLP   EQU    22H       ;DISABLE LP
0023             25 ENBLP   EQU    23H       ;ENABLE LP
0028             26 DSPOFF  EQU    28H       ;DISPLAY OFF
0029             27 DSPON   EQU    29H       ;DISPLAY ON
0030             28 CUROFF  EQU    30H       ;CURSOR OFF
0031             29 CURON   EQU    31H       ;CURSOR ON
005F             30 RSTISR  EQU    5FH       ;RESET EACH BIT OF INT. STATUS REG.
009F             31 DISINT  EQU    9FH       ;DISABLE ALL INTERRUPTS
0081             32 DISLPI  EQU    81H       ;DISABLE LP INTERRUPT
0061             33 ENBLPI  EQU    61H       ;ENABLE ...
                 34 ;
00A4             35 RDPNT   EQU    0A4H      ;READ AT POINTER
00A2             36 WRPNT   EQU    0A2H      ;WRITE ...
```

```
00A9            37 INCCUR  EQU   0A9H           ;INC CURSOR
00AC            38 RDCUR   EQU   0ACH           ;READ AT CURSOR
00AA            39 WRCUR   EQU   0AAH           ;WRITE . . .
00AD            40 RDCURI  EQU   0ADH           ;READ AT CURSOR, AUTO-INCREMENT
00AB            41 WRCURI  EQU   0ABH           ;WRITE . . .
00BB            42 WRCTP   EQU   0BBH           ;WRITE @ CURSOR TO POINTER (BLOCK)
                43 ;
                44 ; BIT MASKS
0001            45 LPBIT   EQU   1              ;LP MASK BIT FOR STATUS REG.
0020            46 RDFLG   EQU   20H            ;READY-FLAG MASK BIT . . .
0000            47 LPACT   EQU   00H            ;LP ACTUATOR SWITCH
                48 ;
                49 ; LP PARAMETERS -- FILTER, DELAY
0080            50 ROWS    EQU   128
0010            51 COLS    EQU   16
0008            52 BITS    EQU   8              ;8 BITS/CHAR
0080            53 BCOLS   EQU   BITS*COLS
0004            54 TIMEOUT EQU   4              ;4 SCANS ? 180MSEC
                55 ;
FFFA            56 DEV     EQU   -6             ;ALLOWED DEVIATION FROM BASE HIT (REF.)
0004            57 HITMIN  EQU   4              ;MIN REQUIRED # HITS
FE00            58 ROWOFF  EQU   -4*BCOLS       ;VERTICAL OFFSET FROM BASE HIT
FFF7            59 PIXOFF  EQU   -9             ;HORZ OFFSET
00FE            60 PIXEL   EQU   0FEH           ;BIT MASK FOR PIXEL
                61 ;
0001            62 MINROW  EQU   1              ;MIN, MAX DISTANCE FILTERS --
0001            63 MINCOL  EQU   1              ;  NO LINE DRAWN UNLESS WITHIN MIN, MAX
0032            64 MAXROW  EQU   50
0032            65 MAXCOL  EQU   50
                66 ;
000A            67 ANGS    EQU   10
                68 ;
                69 ; ********************************************************
                70 ;
                71 ; DATA DEFINITIONS -- VARIABLES
                72 ;
2000            73 RAM:    ORG   2000H          ;START OF RAM
2000            74 DATSTK: DS    2              ;DATA STACK
2002            75 HITCNT: DS    1              ;# HITS PROCESSED FOR AVG
2003            76 SUM:    DS    3
2006            77 LAST:   DS    2              ;LAST HIT (BASE)
2008            78 SCNOFF: DS    2              ;OFFSET FROM BASE TO NEXT HIT
200A            79 CNTR:   DS    2              ;COUNT # HIT AVG'S SINCE RESET
                80 ;
200C            81 ROW0:   DS    2              ;ROW OF PREVIOUS HIT
200E            82 BCOL0:  DS    2
2010            83 ROW1:   DS    2              ;ROW OF PRESENT HIT
2012            84 BCOL1:  DS    2
2014            85 HITAD0: DS    2              ;HIT ADDRESS
2016            86 HITAD1  DS    2
                87 ;
2018            88 DELROW: DS    2              ;DELTA ROW1 - ROW0
201A            89 DELCOL: DS    2
201C            90 SGNROW: DS    1
201D            91 SGNCOL: DS    1              ;SIGN OF DELCOL
                92 ;
201E            93 QUAD:   DS    1              ;QUADRANT OF VECTOR
201F            94 DELX:   DS    2              ;DELROW OR DELCOL DEPENDING ON QUAD
2021            95 DELY:   DS    2
2023            96 INCX:   DS    2              ;INC FOR HITAD WHEN X+1 IN ALG.
2025            97 INCY:   DS    2
2027            98 COUNT:  DS    1              ;ALG COUNTER = DELX
                99 ;
               100 ;
```

```
2700              101 DATTOP  EQU     2700H        ;TOP OF DATA STACK
                  102 ;
26C0              103 DATEND  EQU     DATTOP-64    ;DATA OVERRUN IF SP<END (N*4)
                  104 ;
2800              105 STKTOP  EQU     2800H        ;TOP OF STACK
                  106 ;
                  107 ;   SIG 2672 REGISTERS
                  108 ;
                  109 ;       READ ONLY:
4000              110 CRTINT  EQU     4000H        ;INTERRUPT REG.
4001              111 CRTSTA  EQU     4001H        ;STATUS
4002              112 SCRSTL  EQU     4002H        ;SCREEN START LOW BYTE (READ/WRITE)
4003              113 SRCSTH  EQU     4003H
4004              114 CURADL  EQU     4004H        ;CURSOR ADDRS LOW (READ/WRITE)
4005              115 CURADH  EQU     4005H
4006              116 LPADL   EQU     4006H        ;LP HIT ADDRS LOW
4007              117 LPADH   EQU     4007H
                  118 ;
                  119 ;       WRITE ONLY:
4000              120 CRTINI  EQU     4000H        ;CRT INITIALIZE REG.
4001              121 CRTCMD  EQU     4001H        ;COMMAND REG.
4006              122 PNTADL  EQU     4006H        ;POINTER ADDRS LOW
4007              123 PNTADH  EQU     4007H
                  124 ;
                  125 ;   OTHER REGISTERS
                  126 ;
5000              127 PIXDAT  EQU     5000H        ;PIXEL DATA LATCH
6000              128 CRTDAT  EQU     6000H        ;CRT DATA LATCH (READ/WRITE)
                  129 ;
                  130 ;
                  131 ; **********************************************
                  132 ;
                  133 ;   START OF PROGRAM
                  134 ;
0000              135         ORG     0
0000 C33E00       136         JMP     START
                  137 ;
0024              138         ORG     24H          ;TRAP
0024 FB           139         EI
0025 C9           140         RET
                  141 ;
002C              142         ORG     2CH          ;RST5.5
002C FB           143         EI
002D C9           144         RET
                  145 ;
0034              146         ORG     34H          ;RST6.5
0034 C33403       147         JMP     RST65
0037 C9           148         RET
                  149 ;
003C              150         ORG     3CH          ;RST7.5
003C FB           151         EI
003D C9           152         RET
                  153 ;
                  154 ;
                  155 ;   INIT ROUTINE
                  156 ;
003E F3           157 START:  DI
003F 310028       158         LXI     SP,STKTOP
                  159 ;
                  160 ; DECIDE CHARACTER GRAPHICS OR BIT GRAPHICS
                  161 ;
0042 20           162         RIM
0043 E680         163         ANI     80H          ;SID BIT: 0-BIT GRAPHICS
0045 C2FD02       164         JNZ     CHRGRA
```

```
165 ;
166 ; ******************************************************
167 ;
168 ; BIT GRAPHICS ROUTINES
169 ;
170 ;
171 ;
172 ; INIT CRT
173 ;
0048 21C704      174         LXI     H,INITB2     ;CRT INIT TB -- 16X128 OF 8X1
004B CD4703      175         CALL    INICRT
                 176 ;
004E CD9C03      177         CALL    READY        ;WAIT FOR 2672 READY
0051 3E9F        178         MVI     A,DISINT     ;DISABLE ALL INT'S TO 2672
0053 320140      179         STA     CRTCMD
                 180 ;
                 181 ; FILL SCREEN WITH '1'S
0056 3EFF        182         MVI     A,0FFH
0058 210000      183         LXI     H,0
005B 11FF07      184         LXI     D,07FFH ;2K DISPLAY RAM
005E CD8403      185         CALL    BLOCK        ;DISPLAY BLOCK OF CHAR'S
                 186 ;
                 187 ; SET CURSOR POSITION
                 188 ;
0061 CD9C03      189         CALL    READY
0064 21FF07      190         LXI     H,07FFH ;MOVE CURSOR TO END OF RAM
0067 220440      191         SHLD    CURADL
                 192 ;
                 193 ;
                 194 ; TURN SCREEN ON, LP ENABLE
                 195 ;
006A 3E29        196         MVI     A,DSPON ;DISPLAY ON
006C 320140      197         STA     CRTCMD
006F 3E31        198         MVI     A,CURON      ;CURSOR ON
0071 320140      199         STA     CRTCMD
                 200 ;
0074 3E23        201         MVI     A,ENBLP
0076 320140      202         STA     CRTCMD
                 203 ;
                 204 ;
0079 3E5F        205         MVI     A,RSTISR     ;RESET STATUS REG.
007B 320140      206         STA     CRTCMD
                 207 ;
                 208 ; ENABLE INTERRUPTS: CLEAR SCREEN, ETC . . .
                 209 ;
007E 3E18        210         MVI     A,18H
0080 30          211         SIM
0081 FB          212         EI
                 213 ;
                 214 ; INIT VARIABLE FOR FILTER, ETC . . .
                 215 ;
                 216 ;
0082 210008      217         LXI     H,0
0085 220A20      218         SHLD    CNTR         ;INIT HIT AVG. COUNTER
0088 3EFF        219         MVI     A,0FFH
008A 320D20      220         STA     ROW0+1       ;FLAG UNDEFINED PREVIOUS ROW,
                 221 ;
                 222 ;
008D 310027      223         LXI     SP,DATTOP    ;PREPARE FOR DATA ACQUISITION
                 224                              ; SAVE PRESENT STACK ??
0090 0EFF        225         MVI     C,0FFH  ;TIMER=MAX (OFF)
0092 0604        226         MVI     B,TIMOUT     ;TIMEOUT COUNT = 3 SCANS
                 227 ;
0094 3A0140      228 LPWAIT: LDA     CRTSTA
```

```
0097 E601      229         ANI     LPBIT
0099 CAA800    230         JZ      LPWAI2
               231 ;
               232 LPHIT:
009C 3A0050    233         LDA     PIXDAT
009F F5        234         PUSH    PSW     ;SAVE DATA ON STACK
00A0 2A0640    235         LHLD    LPADL
00A3 E5        236         PUSH    H
00A4 48        237         MOV     C,B     ;RESET TIMER
00A5 C39400    238         JMP     LPWAIT
               239 ;
               240 LPWAI2:
00A8 0D        241         DCR     C
00A9 C29400    242         JNZ     LPWAIT
00AC C3AF00    243         JMP     LPAVG
               244 ;
               245 ;       *** WARNING -- 2672 MAY LOCK-UP WITH CONTINUOUS HITS
               246 ;               STACK WILL OVERFLOW !
               247 ;
               248 ;
               249 ;   AVERAGE DATA ON STACK
               250 ;       BLANK DOT @ AVG LOCATION
               251 ;
00AF 210000    252 LPAVG:  LXI     H,0
00B2 39        253         DAD     SP
00B3 7D        254         MOV     A,L
00B4 FED0      255         CPI     LOW DATTOP
00B6 CAB501    256         JZ      LPEND   ;NO DATA, RESET SP, TIMER
00B9 FEC0      257         CPI     LOW DATEND
00BB DAB501    258         JC      LPEND   ;DATA OVERFLOW- IGNORE
               259 ;
00BE 3EC0      260         MVI     A,0C0H  ;SET SOD FOR TIMMING MEASUREMENTS
00C0 30        261         SIM
00C1 220020    262         SHLD    DATSTK  ;SAVE DATA STACK POINTER
00C4 310028    263         LXI     SP,STKTOP       ;RESTORE PREVIOUS STACK ??
00C7 CDA703    264         CALL    GETDAT  ;GET HL=LPAD&PIXEL OFF DATASTK, INC D
               265 ;
00CA 220620    266         SHLD    LAST    ;LAST LPAD, USE AS BASE
00CD 220320    267         SHLD    SUM     ;CUMMULATIVE SUM FOR AVG.
00D0 AF        268         XRA     A
00D1 320520    269         STA     SUM+2   ;MSB OF SUM
00D4 3C        270         INR     A
00D5 320220    271         STA     HITCNT  ;HIT COUNTER FOR AVG.
00D8 210000    272         LXI     H,0
00DB 220820    273         SHLD    SCNOFF
               274 ;
00DE 3A0020    275 NXTDAT: LDA     DATSTK  ;LOW BYTE
00E1 FED0      276         CPI     LOW DATTOP
00E3 CABED1    277         JZ      ENDDAT  ;ALL DATA PROCESSED
               278 ;
00E6 CDA703    279         CALL    GETDAT  ;GET HL=NEXT HIT
00E9 EB        280         XCHG            ;DE=NEXT HIT
00EA 2A0820    281         LHLD    SCNOFF
00ED 19        282         DAD     D       ;OFFSET TO BASE HIT
00EE EB        283         XCHG
               284 ;
               285 ;   TEST IF NEXT ON SAME SCAN OFFSET
               286 ;
00EF 2A0620    287         LHLD    LAST    ;TEST: NEXT<=LAST (LAST-NEXT)
00F2 7D        288         MOV     A,L
00F3 93        289         SUB     E
00F4 7C        290         MOV     A,H
00F5 9A        291         SBB     D
```

```
00F6 DA1901    292          JC      NXTDA2   ;NO...
               293 ;
00F9 01FAFF    294          LXI     B,DEV    ;TEST: NEXT>LAST-DEV
00FC 09        295          DAD     B
00FD 7D        296          MOV     A,L
00FE 93        297          SUB     E
00FF 7C        298          MOV     A,H
0100 9A        299          SBB     D
0101 D21901    300          JNC     NXTDA2   ;NO...
               301 ;GOOD DATA -- SAME SCAN
0104 2A0320    302          LHLD    SUM      ;CUMMULATE DATA
0107 19        303          DAD     D
0108 220320    304          SHLD    SUM
010B D21201    305          JNC     NXTDA1
               306 ;
010E 210520    307          LXI     H,SUM+2  ;MSB ADDRESS
0111 34        308          INR     M
               309 ;
0112 210220    310 NXTDA1   LXI     H,HITCNT
0115 34        311          INR     M
0116 C38B01    312          JMP     NXTDA9   ;NEXT HIT
               313 ;
               314 ; TEST IF NEXT HIT ON NEXT SCAN OFFSET
               315 ;
0119 218000    316 NETDA2:  LXI     H,BCOLS  ;OFFSET NEXT HIT TO BASE HIT
011C 19        317          DAD     D
011D EB        318          XCHG
               319 ;
011E 2A0620    320          LHLD    LAST     ;TEST: NEXT<=LAST
0121 7D        321          MOV     A,L
0122 93        322          SUB     E
0123 7C        323          MOV     A,H
0124 9A        324          SBB     D
0125 DA5201    325          JC      NXTDA4   ;NO...
               326 ;
0128 01FAFF    327          LXI     B,DEV    ;TEST: NEXT>LAST-DEV
012B 09        328          DAD     B
012C 7D        329          MOV     A,L
012D 93        330          SUB     E
012E 7C        331          MOV     A,H
012F 9A        332          SBB     D
0130 D25201    333          JNC     NXTDA4   ;NO...
               334 ;GOOD DATA -- NEXT SCAN OFFSET
0133 2A0320    335          LHLD    SUM
0136 19        336          DAD     D
0137 220320    337          SHLD    SUM
013A D24101    338          JNC     NXTDA3
               339 ;
013D 210520    340          LXI     H,SUM+2
0140 34        341          INR     M        ;INCREMENT MSB OF SUM
               342 ;
0141 210220    343 NXTDA3:  LXI     H,HITCNT
0144 34        344          INR     M
0145 2A0820    345          LHLD    SCNOFF   ;MOVE SCAN OFFSET TO NEXT ROW
0148 118000    346          LXI     D,BCOLS
014B 19        347          DAD     D
014C 220820    348          SHLD    SCNOFF
014F C38B01    349          JMP     NXTDA9   ;NEXT DATA
               350 ;
               351 ; TEST IF NEXT HIT 2 SCANS FROM LAST NEXT HIT
               352 ;
               353 NXTDA4:
0152 218000    354          LXI     H,BCOLS
0155 19        355          DAD     D        ;OFFSET NEXT HIT
```

```
0156 EB           356            XCHG
                  357 ;
0157 2A0620       358            LHLD    LAST    ;TEST: NEXT <= LAST
015A 7D           359            MOV     A,L
015B 93           360            SUB     E
015C 7C           361            MOV     A,H
015D 9A           362            SBB     D
015E DAB801       363            JC      NXTDA6  ;NO ...
                  364 ;
0161 01FAFF       365            LXI     B,DEV   ;TEST: NEXT > LAST-DEV
0164 09           366            DAD     B
0165 7D           367            MOV     A,L
0166 93           368            SUB     E
0167 7C           369            MOV     A,H
0168 9A           370            SBB     D
0169 D2B801       371            JNC     NXTDA6  ;NO ...
                  372 ;
                  373 ;GOOD DATA -- NEXT+1 SCAN OFFSET
016C 2A0320       374            LHLD    SUM
016F 19           375            DAD     D
0170 220320       376            SHLD    SUM
0173 D27A01       377            JNC     NXTDA5
                  378 ;
0176 210520       379            LXI     H,SUM+2
0179 34           380            INR     M
                  381 ;
017A 210220       382 NXTDA5:    LXI     H,HITCNT
017D 34           383            INR     M
017E 2A0820       384            LHLD    SCNOFF
0181 118000       385            LXI     D,BCOLS
0184 19           386            DAD     D
0185 220820       387            SHLD    SCNOFF
0188 C3BB01       388            JMP     NXTDA9
                  389 ;
                  390 ; NO MATCH -- IGNORE HIT AND GO TO NEXT ONE
                  391 ;
                  392 NXTDA6:
                  393 ;
018B C3DE00       394 NXTDA9:    JMP     NXTDAT  ;GET NEXT HIT
                  395 ;
                  396 ; END OF DATA -- CHECK IF ACCEPTABLE # HITS & AVG.
                  397 ;
                  398 ENDDAT:
018E 3A0220       399            LDA     HITCNT
0191 FE04         400            CPI     HITMIN
0193 DAB501       401            JC      LPEND   ;TOO FEW POINTS
                  402 ;
0196 57           403            MOV     D,A     ;PREPARE FOR DIV24
0197 2A0320       404            LHLD    SUM
019A 3A0520       405            LDA     SUM+2
019D 5F           406            MOV     E,A     ;PREPARE FOR DIV24
019E E5           407            PUSH    H
019F C1           408            POP     B
01A0 CDC805       409            CALL    DIV24   ;E:BC / D -> BC, REM E
                  410 ;
01A3 2100FE       411            LXI     H,ROWOFF ;OFFSET AVG. HITAD
01A6 09           412            DAD     B
01A7 01F7FF       413            LXI     B,PIXOFF
01AA 09           414            DAD     B
                  415 ;
01AB CDC201       416            CALL    DRAW    ;CLEAR PIXEL @ HL
                  417 ;
01AE 2A0A20       418            LHLD    CNTR
```

```
01B1 23             419         INX     H
01B2 220A20         420         SHLD    CNTR
                    421 ;
                    422 ;
                    423 ;   RESET REG'S FOR NEXT SCAN
                    424 ;
01B5 310027         425 LPEND:  LXI     SP,DATTOP   ;SAVE CURRENT SP ??
01B8 0EFF           426         MVI     C,0FFH
01BA 0604           427         MVI     B,TIMOUT
                    428 ;
01BC 3E40           429         MVI     A,40H       ;RESET SOD TIMMING INDICATOR
01BE 30             430         SIM
01BF C39400         431         JMP     LPWAIT
                    432 ;
                    433 ;
                    434 ;
                    435 ;
                    436 ;   DRAW VECTOR FROM PREVIOUS HIT TO PRESENT HIT
                    437 ;       HITAD0 -> ROW0,BCOL0 = PREVIOUS HIT
                    438 ;       HITAD1 -> ROW1,BCOL1 = PRESENT HIT
                    439 ;       USET EXTENDED ROW,COL (FIXED PT. X.XXXX)
                    440 ;  ***  WATCH FOR OVERFLOW IN ROW, COL (<127)
                    441 ;
                    442 ;       GIVEN: HL = PRESENT HITAD
                    443 ;
                    444 ;
                    445 DRAW:
01C2 F5             446         PUSH    PSW
01C3 C5             447         PUSH    B
01C4 D5             448         PUSH    D
01C5 E5             449         PUSH    H
                    450 ;
01C6 221620         451         SHLD    HITAD1
01C9 CD3404         452         CALL    GETRC       ;GET DE=ROW, HL=BCOL FROM HL
01CC 221220         453         SHLD    BCOL1
01CF EB             454         XCHG
01D0 221020         455         SHLD    ROW1
                    456 ;
01D3 3ADD20         457         LDA     ROW0+1      ;CHECK FOR UNDEFINED FLAG
01D6 FEFF           458         CPI     0FFH
01D8 C2ED01         459         JNZ     DRAW2
                    460 ;
01DB 2A1020         461         LHLD    ROW1        ;FIRST HIT -- SET ROW,BCOL0
01DE 220C20         462         SHLD    ROW0
01E1 2A1220         463         LHLD    BCOL1
01E4 220E20         464         SHLD    BCOL0
01E7 2A1620         465         LHLD    HITAD1
01EA 221420         466         SHLD    HITAD0
                    467 ;
                    468 ;   COMPUTE DISTANCES ROW,COL1 - 0
                    469 ;
                    470 DRAW2:
01ED 2A0C20         471         LHLD    ROW0        ;COMPUTE ROW1 - ROW0
01F0 3A1020         472         LDA     ROW1
01F3 95             473         SUB     L
01F4 6F             474         MOV     L,A
01F5 3A1120         475         LDA     ROW1+1
01F8 9C             476         SBB     H
01F9 67             477         MOV     H,A
01FA 321C20         478         STA     SGNROW      ;SIGN OF DEL ROW
01FD F20602         479         JP      DRAW4
0200 2F             480         CMA
0201 67             481         MOV     H,A
0202 7D             482         MOV     A,L
```

```
0203 2F         483             CMA
0204 6F         484             MOV     L,A
0205 23         485             INX     H
0206 221820     486 DRAW4:      SHLD    DELROW  ;ABS VALUE
                487 ;
0209 2A0E20     488             LHLD    BCOL0   ;BCOL1 - BCOL0
020C 3A1220     489             LDA     BCOL1
020F 95         490             SUB     L
0210 6F         491             MOV     L,A
0211 3A1320     492             LDA     BCOL1+1
0214 9C         493             SBB     H
0215 67         494             MOV     H,A
0216 321D20     495             STA     SGNCOL
0219 F23002     496             JP      DRAW6
021C 2F         497             CMA
021D 67         498             MOV     H,A
021E 7D         499             MOV     A,L
021F 2F         500             CMA
0220 6F         501             MOV     L,A
0221 23         502             INX     H
0222 0601       503             MVI     B,1
0224 3A1C20     504             LDA     SGNROW
0227 A7         505             ANA     A
0228 F23E02     506             JP      DRAW8
022B 0602       507             MVI     B,2
022D C33E02     508             JMP     DRAW8
                509 ;
0230 0600       510 DRAW6:      MVI     B,0
0232 3A1C20     511             LDA     SGNROW
0235 A7         512             ANA     A
0236 F23E02     513             JP      DRAW8
0239 0603       514             MVI     B,3
023B C33E02     515             JMP     DRAW8
                516 ;
023E 78         517 DRAW8:      MOV     A,B
023F 321E20     518             STA     QUAD
0242 221A20     519             SHLD    DELCOL
                520 ;
                521 ;   APPLY MIN/MAX DISTANCE TEST
                522 ;
0245 110100     523             LXI     D,MINCOL
0248 7D         524             MOV     A,L
0249 93         525             SUB     E
024A 7C         526             MOV     A,H
024B 9A         527             SBB     D
024C DAF802     528             JC      ENDDRA  ;FAILED MIN DISTANCE
                529 ;
024F 113200     530             LXI     D,MAXCOL
0252 7D         531             MOV     A,L
0253 93         532             SUB     E
0254 7C         533             MOV     A,H
0255 9A         534             SBB     D
0256 D2F802     535             JNC     ENDDRA
                536 ;
0259 110100     537             LXI     D,MINROW
025C 2A1820     538             LHLD    DELROW
025F 7D         539             MOV     A,L
0260 93         540             SUB     E
0261 7C         541             MOV     A,H
0262 9A         542             SBB     D
0263 DAF802     543             JC      ENDDRA
                544 ;
0266 113200     545             LXI     D,MAXROW
```

```
0269 7D           546           MOV    A,L
026A 93           547           SUB    E
026B 7C           548           MOV    A,H
026C 9A           549           SBB    D
026D D2F802       550           JNC    ENDDRA
                  551 ;
                  552 ;
                  553 ;  COMPUTE OCTANT & INCREMENTS FOR VECTOR
                  554 ;
0270 2A1A20       555           LHLD   DELCOL
0273 EB           556           XCHG
0274 2A1820       557           LHLD   DELROW
0277 7D           558           MOV    A,L
0278 93           559           SUB    E
0279 7C           560           MOV    A,H
027A 9A           561           SBB    D
027B 3A1E20       562           LDA    QUAD    ;ASSUME DELROW<DELCOL
                  563 ;                         DE=DELX=COL
027E 2A1820       564           LHLD   DELROW  ; HL=DELY=ROW
0281 DA8D02       565           JC     OCT2
                  566 ;
0284 C604         567           ADI    4
0286 2A1820       568           LHLD   DELROW
0289 EB           569           XCHG           ; DE=ROW
028A 2A1A20       570           LHLD   DELCOL  ; HL=COL
                  571 ;
028D 222120       572 OCT2:     SHLD   DELY
0290 EB           573           XCHG
0291 221F20       574           SHLD   DELX
0294 47           575           MOV    B,A     ;COMPUTE OFFSET IN INC TABLES
0295 07           576           RLC
0296 80           577           ADD    B       ; = *6
0297 07           578           RLC
0298 321E20       579           STA    QUAD
                  580 ;
029B 21D204       581           LXI    H,INCXTB
029E 0600         582           MVI    B,0
02A0 4F           583           MOV    C,A
02A1 09           584           DAD    B
02A2 5E           585           MOV    E,M
02A3 23           586           INX    H
02A4 56           587           MOV    D,M
02A5 EB           588           XCHG
02A6 222320       589           SHLD   INCX
                  590 ;
02A9 210205       591           LXI    H,INCYTB
02AC 09           592           DAD    B
02AD 5E           593           MOV    E,M
02AE 23           594           INX    H
02AF 56           595           MOV    D,M
02B0 EB           596           XCHG
02B1 222520       597           SHLD   INCY
                  598 ;
                  599 ; VECTOR DRAW ALGORITHM -- DDJ DEC82
                  600 ;     ASSUMES DELX, DELY ... < 128
                  601 ;     ASSUMES F (= + - 1/2 DELX) < 64 !
                  602 ;
                  603 ;
02B4 3A1F20       604           LDA    DELX    ;ONLY USE 8 BITS
02B7 47           605           MOV    B,A     ;B = DELX
02B8 322720       606           STA    COUNT
02BB 3A2120       607           LDA    DELY
02BE 4F           608           MOV    C,A     ;C = DELY
```

```
02BF AF           609            XRA     A         ;A = F = 0
                  610 ;
02C0 2A1420       611 ALG2:      LHLD    HITADO
02C3 CDF103       612            CALL    CLRPIX    ;CLEAR PIXEL @ HL
02C6 EB           613            XCHG
02C7 2A2320       614            LHLD    INCX
02CA 19           615            DAD     D
02CB 81           616            ADD     C         ;F=F+DELY
02CC A7           617            ANA     A         ;F<0
02CD FADC02       618            JM      ALG8
                  619 ;
02D0 07           620            RLC
02D1 B8           621            CMP     B         ;2F<DELX?
02D2 0F           622            RRC
02D3 FADC02       623            JM      ALG8
                  624 ;
02D6 90           625            SUB     B         ;F=F-DELX
02D7 EB           626            XCHG
02D8 2A2520       627            LHLD    INCY
02DB 19           628            DAD     D
                  629 ;
02DC 221420       630 ALG8:      SHLD    HITADO
02DF 212720       631            LXI     H,COUNT
02E2 35           632            DCR     M
02E3 C2C002       633            JNZ     ALG2
                  634 ;
02E6 2A1420       635            LHLD    HITADO
02E9 CDF103       636            CALL    CLRPIX
                  637 ;
02EC 2A1020       638            LHLD    ROW1
02EF 220C20       639            SHLD    ROW0
02F2 2A1220       640            LHLD    BCOL1
02F5 220E20       641            SHLD    BCOL0
                  642 ;
                  643 ;
                  644 ;
                  645 ;
                  646 ;
                  647 ;
                  648 ; DONE
                  649 ;     COULD SAVE EACH VECTOR IN COMPRESSED FORM:
                  650 ;         — 2 BITS EA. FOR ROW, COL
                  651 ;         — 10 = LEFT
                  652 ;         — 00 = NO CHANGE
                  653 ;         — 01 = RIGHT
                  654 ;
                  655 ;
                  656 ENDDRA:
02F8 F1           657            POP     PSW
02F9 C1           658            POP     B
02FA D1           659            POP     D
02FB E1           660            POP     H
02FC C9           661            RET
                  662 ;
                  663 ;
                  664 ;
                  665 ;
                  666 ;
                  667 ;
                  668 ;************************************************
                  669 ;
                  670 ; CHARACTER GRAPHICS ROUTINES
                  671 ;
```

```
                    672 CHRGRA:
                    673 ;
                    674 ;   INIT CRT
                    675 ;
02FD 21B104         676         LXI     H,INITB0        ;80X25 OF 9X14
0300 CD4703         677         CALL    INICRT
                    678 ;
0303 CD9C03         679         CALL    READY
0306 3E9F           680         MVI     A,DISINT
0308 320140         681         STA     CRTCMD
                    682 ;
                    683 ;   FILL SCREEN WITH BLANKS
                    684 ;
030B 3E00           685         MVI     A,0
030D 210000         686         LXI     H,0
0310 11FF07         687         LXI     D,07FFH
0313 CD8403         688         CALL    BLOCK
                    689 ;
                    690 ;   SET ATTRIBUTES, TURN ON SCREEN & CURSOR
                    691 ;
0316 3E51           692         MVI     A,81    ;CHARACTER GRAPHICS
0318 210000         693         LXI     H,0
031B CD7103         694         CAL     DISPLY
                    695 ;
031E CD9C03         696         CALL    READY
0321 3E29           697         MVI     A,DSPON
0323 320140         698         STA     CRTCMD
0326 3E31           699         MVI     A,CURON
0328 320140         700         STA     CRTCMD
                    701 ;
                    702 ;   POSITION CURSOR
                    703 ;
032B 210100         704         LXI     H,1
032E 220440         705         SHLD    CURADL
                    706 ;
                    707 ; ---- NOT FINNISHED, USE FOR TEST ONLY
                    708 ;
0331 C33103         709 LOOP2:  JMP     LOOP2
                    710 ;
                    711 ;
                    712 ;
                    713 ;
                    714 ; ****************************************************
                    715 ;
                    716 ;   INTERRUPT SERVICE ROUTINES
                    717 ;
                    718 ;
0334 F5             719 RST65:  PUSH    PSW
0335 D5             720         PUSH    D
0336 E5             721         PUSH    H
0337 3EFF           722         MVI     A,0FFH
0339 210000         723         LXI     H,0
033C 11FF07         724         LXI     D,7FFH
033F CD8403         725         CALL    BLOCK
0342 E1             726         POP     H
0343 D1             727         POP     D
0344 F1             728         POP     PSW
0345 FB             729         EI
0346 C9             730         RET
                    731 ;
                    732 ;
                    733 ;
```

```
734 ;
735 ; *******************************************************
736 ;
737 ;   SUBROUTINES
738 ;
739 ;
740 ;
741 ;   INITIALIZE CRT CONTROLLER (2672)
742 ;       HL -- ADDRES OF UNIT TABLE
743 ;       ASSUME TABLE LENGTH = 11
744 ;
0347 F5        745 INICRT: PUSH   PSW
0348 C5        746         PUSH   B
0349 D5        747         PUSH   D
034A E5        748         PUSH   H
               749 ;
034B 5D        750         MOV    E,L        ;SAVE ADRS OF TABLE
034C 54        751         MOV    D,H
               752 ;
034D 060B      753         MVI    B,11       ;LENGTH OF INIT TABLE
034F 3E00      754         MVI    A,MASRST   ;RESET 2672
0351 320140    755         STA    CRTCMD
0354 00        756         NOP
0355 00        757         NOP                ; ALSO NEEDS 1USEC BETWEEN RESETS
0356 320140    758         STA    CRTCMD     ;BUG -- NEEDS TWO RESETS
               759 ;
0359 7E        760 INICR2: MOV    A,M
035A 320040    761         STA    CRTINI
035D 23        762         INX    H
035E 05        763         DCR    B
035F C25903    764         JNZ    INICR2
               765 ;
0362 3E00      766         MVI    A,MASRST    BUG -- NEEDS FIRST BYTE AGAIN
0364 320140    767         STA    CRTCMD
0367 EB        768         XCHG              ;RETRIEVE TABLE ADRS
0368 7E        769         MOV    A,M
0369 320040    770         STA    CRTINI
               771 ;
036C E1        772         POP    H
036D D1        773         POP    D
036E C1        774         POP    B
036F F1        775         POP    PSW
0370 C9        776         RET
               777 ;
               778 ;
               779 ;
               780 ; DISPLAY CHARACTER
               781 ;    A -- CHARACTER (BINARY BIT PATTERN)
               782 ;    HL-- LOCATION TO DISPLAY
               783 ;
0371 F5        784 DISPLY: PUSH   PSW
0372 E5        785         PUSH   H
               786 ;
0373 CD9C03    787         CALL   READY
0376 320080    788         STA    CRTDAT
0379 220640    789         SHLD   PNTADL
               790 ;
037C 3EA2      791         MVI    A,WRPNT
037E 320140    792         STA    CRTCMD
               793 ;
0381 E1        794         POP    H
0382 F1        795         POP    PSW
0383 C9        796         RET
```

```
797 ;
798 ;
799 ;
800 ;   DISPLAY BLOCK OF CHARACTERS
801 ;        A -- CHARACTER (BINARY)
802 ;        HL-- START LOCATION
803 ;        DE-- END LOCATION
804 ;
0384 F5           805 BLOCK:   PUSH    PSW
0385 E5           806          PUSH    H
                  807 ;
0386 CD9C03       808          CALL    READY
0389 320060       809          STA     CRTDAT
038C 220440       810          SHLD    CURADL
038F EB           811          XCHG
0390 220640       812          SHLD    PNTADL
0393 EB           813          XCHG              ;RESTORE DE
                  814 ;
0394 3EBB         815          MVI     A,WRCTP
0396 320140       816          STA     CRTCMD
                  817 ;
0399 E1           818          POP     H
039A F1           819          POP     PSW
039B C9           820          RET
                  821 ;
                  822 ;
                  823 ;   TEST READY FLAG OF 2672
                  824 ;
039C F5           825 READY:   PUSH    PSW
039D 3A0140       826 READY2:  LDA     CRTSTA
03A0 E620         827          ANI     RDFLG
03A2 CA9D03       828          JZ      READY2
                  829 ;
03A5 F1           830          POP     PSW
03A6 C9           831          RET
                  832 ;
                  833 ;
                  834 ;
                  835 ;   GET DATA OFF DATA STACK
                  836 ;      GIVEN:
                  837 ;         DATSTK -- ADDRESS OF BOTTOM OF STACK (LAST ENTRY)
                  838 ;;     RETURN:
                  839 ;         HL -- LPAD&PIXEL
                  840 ;         DATSTK -- MOVED TO NEXT DATA
                  841 ;
                  842 ;
                  843 GETDAT:
03A7 F5           844          PUSH    PSW
03A8 C5           845          PUSH    B
03A9 D5           846          PUSH    D
                  847 ;
03AA 2A0020       848          LHLD    DATSTK
03AD 5E           849          MOV     E,M       ;LPAD-L
03AE 23           850          INX     H
03AF 56           851          MOV     D,M       ;LPAD-H
03B0 23           852          INX     H
03B1 23           853          INX     H
03B2 7E           854          MOV     A,M       ;PIXEL LATCH
03B3 23           855          INX     H         ;SET HL TO NEXT DATA
03B4 220020       856          SHLD    DATSTK
03B7 EB           857          XCHG              ;HL NOW HAS LPAD
03B8 57           858          MOV     D,A       ;D HAS PIXEL LATCH
                  859 ;
```

```
                860 ;   COMPARED LATCH CHR3:0 WITH LPAD
                861 ;       ADJUST LPAD TO MATCH
                862 ;
03B9 0F         863         RRC
03BA 0F         864         RRC
03BB 0F         865         RRC
03BC 0F         866         RRC
03BD E60F       867         ANI     0FH
03BF 5F         868         MOV     E,A         ;SAVE CHR3:0
                869 ;
03C0 7D         870         MOV     A,L         ;GET LPAD3:0
03C1 E60F       871         ANI     0FH
03C3 BB         872         CMP     E
03C4 D2CF03     873         JNC     GETDA2      ;LPAD3:0>LATCH — NO SUB NEEDED
                874 ;
03C7 7D         875         MOV     A,L
03C8 D610       876         SUI     10H
03CA 6F         877         MOV     L,A
03CB 7C         878         MOV     A,H
03CC DE00       879         SBI     0
03CE 67         880         MOV     H,A
                881 ;
03CF 7D         882 GETDA2: MOV     A,L         ;COMBINE LPAD & LATCH CHR3:0
03D0 E6F0       883         ANI     0F0H
03D2 B3         884         ORA     E
03D3 6F         885         MOV     L,A
                886 ;
                887 ;   ROTATE PIXEL INTO HL (3 BITS)
                888 ;
03D4 7A         889         MOV     A,D         ;RE-TRIEVE PIXEL
03D5 E607       890         ANI     07H         ;MASK OFF NON-PIXEL BITS
03D7 57         891         MOV     D,A
03D8 7C         892         MOV     A,H         ;ROTATE HL LEFT 3
03D9 07         893         RLC
03DA 07         894         RLC
03DB 07         895         RLC
03DC E6F8       896         ANI     0F8H
03DE 67         897         MOV     H,A
03DF 7D         898         MOV     A,L
03E0 07         899         RLC
03E1 07         900         RLC
03E2 07         901         RLC
03E3 6F         902         MOV     L,A
03E4 E607       903         ANI     07H
03E6 B4         904         ORA     H
03E7 67         905         MOV     H,A
03E8 7D         906         MOV     A,L
03E9 E6F8       907         ANI     0F8H
03EB B2         908         ORA     D           ;COMBINE WITH PIXEL3:0
03EC 6F         909         MOV     L,A
                910 ;
03ED D1         911         POP     D
03EE C1         912         POP     B
03EF F1         913         POP     PSW
03F0 C9         914         RET
                915 ;
                916 ;
                917 ;
                918 ;   CLEAR PIXEL ON SCREEN
                919 ;       HL — ADDRESS OF PIXEL ON SCREEN
                920 ;               [LPAD&PIXEL]
                921 ;
                922 ;
```

```
                923 CLRPIX:
03F1 F5         924         PUSH    PSW
03F2 C5         925         PUSH    B
03F3 D5         926         PUSH    D
03F4 E5         927         PUSH    H
                928 ;
03F5 45         929         MOV     B,L     ;SAVE PIXEL
03F6 7D         930         MOV     A,L     ;ROTATE HL RIGHT 3 BITS
03F7 0F         931         RRC
03F8 0F         932         RRC
03F9 0F         933         RRC
03FA E61F       934         ANI     1FH
03FC 6F         935         MOV     L,A
03FD 7C         936         MOV     A,H
03FE 0F         937         RRC
03FF 0F         938         RRC
0400 0F         939         RRC
0401 67         940         MOV     H,A
0402 E6E0       941         ANI     0E0H
0404 B5         942         ORA     L
0405 6F         943         MOV     L,A
0406 7C         944         MOV     A,H
0407 E61F       945         ANI     1FH
0409 67         946         MOV     H,A
                947 ;
040A 220640     948         SHLD    PNTADL  ;SET 2672 POINTER
                949 ;
                950 ;   CREATE PIXEL DATA MASK
                951 ;
040D 78         952         MOV     A,B
040E E607       953         ANI     07H     ;MASK NON-PIXEL BITS
0410 4F         954         MOV     C,A     ;USE C AS COUNTER
0411 0C         955         INR     C
0412 3EFE       956         MVI     A,PIXEL
0414 0F         957         RRC
0415 07         958 CLRPI2: RLC
0416 0D         959         DCR     C
0417 C21504     960         JNZ     CLRPI2
041A 47         961         MOV     B,A     ;SAVE PIXEL MASK
                962 ;
                963 ;   GET PRESENT DATA @ HITAD AVG.
                964 ;
041B 3EA4       965         MVI     A,RDPNT
041D 320140     966         STA     CRTCMD
0420 CD9C03     967         CALL    READY
0423 3A0060     968         LDA     CRTDAT
                969 ;
                970 ;   BLANK DATA @ PIXEL
                971 ;
0426 A0         972         ANA     B
0427 320060     973         STA     CRTDAT
042A 3EA2       974         MVI     A,WRPNT
042C 320140     975         STA     CRTCMD
                976 ;
                977 ;
042F E1         978         POP     H
0430 D1         979         POP     D
0431 C1         980         POP     B
0432 F1         981         POP     PSW
0433 C9         982         RET
                983 ;
                984 ;
```

```
985 ;
986 ;
987 ;    GET ROW, COL FROM HITAD
988 ;       ASSUME BASE 1 (SUBSTRACT 1 COL = 8 PIXELS BEFORE DIVIDE)
989 ;          GIVEN:
990 ;             HL -- HITAD
991 ;
992 ;          RETURN:
993 ;             DE -- ROW
994 ;             HL -- BCOL
995 ;
996 ;
997 GETRC:
0434 C5              998          PUSH    B
                     999 ;
0435 11F8FF         1000          LXI     D,-8
0438 19             1001          DAD     D
0439 E5             1002          PUSH    H
043A C1             1003          POP     B
043B 118000         1004          LXI     D,BCOLS
043E CD7005         1005          CALL    DIV16
0441 210800         1006          LXI     H,8
0444 19             1007          DAD     D        ;BCOL + 8
0445 C5             1008          PUSH    B
0446 D1             1009          POP     D        ;ROW TO DE
                    1010 ;
0447 C1             1011          POP     B
0448 C9             1012          RET
                    1013 ;
                    1014 ;
                    1015 ;    GET HIT ADDRESS FROM EXTENDED ROW, BCOL
                    1016 ;       GIVEN: ROWO, BCOLO IN MEMORY
                    1017 ;       RETURN: HITAD IN HL
                    1018 ;
                    1019 GETHIT:
0449 C5             1020          PUSH    B
044A 2A0C20         1021          LHLD    ROWO
044D CD7804         1022          CALL    RRHL
0450 45             1023          MOV     B,L      ;ASSUME ROW<127
0451 0E80           1024          MVI     C,BCOLS  ;FASTER IF ASSUME BCOLS = 128 & SHIFT
0453 CDAD05         1025          CALL    MPY8
0456 2A0E20         1026          LHLD    BCOLO
0459 CD7804         1027          CALL    RRHL
045C 09             1028          DAD     B
                    1029 ;
045D C1             1030          POP     B
045E C9             1031          RET
                    1032 ;
                    1033 ;
                    1034 ;    ROTATE LEFT HL -- 4 TIMES
                    1035 ;
                    1036 RLHL:
045F F5             1037          PUSH    PSW
0460 7C             1038          MOV     A,H
0461 07             1039          RLC
0462 07             1040          RLC
0463 07             1041          RLC
0464 07             1042          RLC
0465 E6F0           1043          ANI     0F0H
0467 67             1044          MOV     H,A
0468 7D             1045          MOV     A,L
0469 07             1046          RLC
046A 07             1047          RLC
046B 07             1048          RLC
```

```
046C 07       1049            RLC
046D 6F       1050            MOV     L,A
046E E60F     1051            ANI     0FH
0470 B4       1052            ORA     H
0471 67       1053            MOV     H,A
0472 7D       1054            MOV     A,L
0473 E6F0     1055            ANI     0F0H
0475 6F       1056            MOV     L,A
              1057 ;
0476 F1       1058            POP     PSW
0477 C9       1059            RET
              1060 ;
              1061 ;
              1062 ;   ROTATE RIGHT HL -- 4 TIMES
              1063 ;
              1064 ; RRHL:
0478 F5       1065            PUSH    PSW
              1066 ;
0479 7D       1067            MOV     A,L
047A 0F       1068            RRC
047B 0F       1069            RRC
047C 0F       1070            RRC
047D 0F       1071            RRC
047E E60F     1072            ANI     0FH
0480 6F       1073            MOV     L,A
0481 7C       1074            MOV     A,H
0482 0F       1075            RRC
0483 0F       1076            RRC
0484 0F       1077            RRC
0485 0F       1078            RRC
0486 67       1079            MOV     H,A
0487 E6F0     1080            ANI     0F0H
0489 B5       1081            ORA     L
048A 6F       1082            MOV     L,A
048B 7C       1083            MOV     A,H
048C E60F     1084            ANI     0FH
048E 67       1085            MOV     H,A
              1086 ;
048F F1       1087            POP     PSW
0490 C9       1088            RET
              1089 ;
              1090 ;
              1091 ;
              1092 ;
              1093 ;
              1094 ;
              1095 ; **************************************************************
              1096 ;
              1097 ;   LIGHT PEN SPECIALITY ROUTINES
              1098 ;
              1099 ;
              1100 ;
              1101 ; LP TEST ROUTINE
              1102 ;     SAVE ALL LP HIT ADRS'S IN CIRCULAR QUE @ 2700
              1103 ;
              1104 LPTEST:
0491 310028   1105            LXI     SP,2800H
              1106 ;
0494 3A0140   1107 LPTES1: LDA     CRTSTA
0497 E601     1108            ANI     LPBIT
0499 CA9404   1109            JZ      LPTES1
              1110 ;
049C 2A0640   1111            LHLD    LPADL
```

```
049F E5         1112            PUSH    H
04A0 3A0050     1113            LDA     PIXDAT
04A3 6F         1114            MOV     L,A
04A4 2600       1115            MVI     H,0
04A6 E5         1116            PUSH    H
04A7 210000     1117            LXI     H,0
04AA 39         1118            DAD     SP
04AB 2627       1119            MVI     H,27H       ;KEEP STACK IN 256 BYTE BOUND
04AD F9         1120            SPHL
04AE C39404     1121            JMP     LPTES1
                1122    ;
                1123    ;
                1124    ;
                1125    ;***********************************************
                1126    ;
                1127    ;   DATA TABLES
                1128    ;
                1129    ;       CRT INITIALIZATION TABLES
                1130    ;
                1131    ;
                1132    ;       TABLE 0:
                1133    ;           80 X 25 OF 9X15 CHARACTER BLOCKS -- ASCII OR CHAR.
                1134    ;           16.8 KHZ HORZ, 60 HZ VERT. MONITOR
                1135    ;           16.128 MHZ CRYSTAL
                1136    ;
                1137    ;
04B1 60         1138    INITB0: DB      60H         ;IR0: 14 SCANS/ROW, NON-LACE
04B2 22         1139            DB      22H         ;IR1: EQU=35
04B3 1A         1140            DB      1AH         ;IR2: HSYNC=8, HBP=9
04B4 04         1141            DB      04H         ;IR3: VFP=4, VBP=12
04B5 98         1142            DB      98H         ;IR4: BLINK=1/32, ROWS=25
04B6 4F         1143            DB      4FH         ;IR5: COLS=80
04B7 1A         1144            DB      1AH         ;IR6: CURSOR SIZE=
04B8 2B         1145            DB      2BH         ;IR7: LP, BLINK=1/32
04B9 00         1146            DB      00H         ;IR8: DISP START= 00H (+IR9)
04BA 10         1147            DB      10H         ;IR9: DISP END=2047, DISP START=0XH
04BB 80         1148            DB      80H         ;IR10:BLINK=1/32, SPLIT SCR=0
                1149    ;
                1150    ;
                1151    ;
                1152    ;
                1153    ;
                1154    ;       TABLE 1:
                1155    ;           80X125 OF 9X2 CHARACTERS (ONLY 80X25, 8X1 USED)
                1156    ;           16.8 KHZ HORZ, 60 HZ VERT MONITOR
                1157    ;           16.128 MHZ CRYSTAL
                1158    ;
                1159    ;
04BC 08         1160    INITB1: DB      08H         ;IR0: 2 SCAN/ROW, NON-LACE . . .
04BD 25         1161            DB      25H         ;IR1: EC=37(-1) ~10 CHARS
04BE 1A         1162            DB      1AH         ;IR2: HSYNC=8(-2/2), HBP=9(-1/4)
04BF 94         1163            DB      94H         ;IR3: VFP=8(-4/4), VBP=18(-4/2)
04C0 7F         1164            DB      ROWS-1      ;IR4: BLINK=1/16, ROWS=125(-1)
04C1 0F         1165            DB      COLS-1      ;IR5: COLS=80 CHARS (-1)
04C2 07         1166            DB      07H         ;IR6: CURSOR= 15 LINES
04C3 2B         1167            DB      2BH         ;IR7: LP,BLINK CURS, SINGLE HT, UNDL @ 11
04C4 30         1168            DB      30H         ;IR8: DISPL START=48 (USE ONLY 2000 CHARS.)
04C5 10         1169            DB      10H         ;IR9: DISPL END = 7FFH, DISPL START = 0XH
                1170                                ;  NEED MORE RAM FOR GRAPHICS !
04C6 00         1171            DB      00H         ;IR10:BLINK=1/16, SPLIT SCREEN @ 0
                1172    ;
                1173    ;
                1174    ;
```

```
                  1175 ;       TABLE2:
                  1176 ;
                  1177 ;            16X128 OF 8X1 CHARACTERS
                  1178 ;            6.72 MHZ CRYSTAL
                  1179 ;            15.? KHZ HORZ, 5? HZ VERT
                  1180 ;
                  1181 ;
04C7 00           1182 INITB2: DB      00H         ;1 SCAN/CHAR
04C8 07           1183         DB      07H         ;EC
04C9 1A           1184         DB      1AH         ;HSYNC,HBP
04CA FF           1185         DB      0FFH        ;3: VFP, VBP
04CB 7F           1186         DB      ROWS-1      ;4: ROWS
04CC 0F           1187         DB      COLS-1      ;5: COLS
04CD 07           1188         DB      07H         ;6: CURS
04CE 2B           1189         DB      2BH         ;7: ...
04CF 00           1190         DB      00H         ;8: DISP START
04D0 10           1191         DB      10H         ;9: DISP END
04D1 00           1192         DB      00H         ;10: ...
                  1193 ;
                  1194 ;
                  1195 ;
                  1196 ;
                  1197 ;
                  1198 ; VECTOR GENERATION TABLE FOR DDJ ALGORIGHM
                  1199 ;
                  1200 ;       INCHIT, (INCROW, INCCOL -- FOR FILTER)
                  1201 ;
                  1202 INCXTB:
04D2 0100         1203         DW      1,0,1       ;DELCOL>DELROW, QUADRANT 0
04D4 0000
04D6 0100
04D8 FFFF         1204         DW      -1,0,-1 ;   Q1
04DA 0000
04DC FFFF
04DE FFFF         1205         DW      -1,0,-1
04E0 0000
04E2 FFFF
04E4 0100         1206         DW      1,0,1
04E6 0000
04E8 0100
04EA 8000         1207         DW      BCOLS,1,0           ;DELROW>DELCOL, QUADRANT 0
04EC 0100
04EE 0000
04F0 8000         1208         DW      BCOLS,1,0
04F2 0100
04F4 0000
04F6 80FF         1209         DW      -BCOLS,-1,0
04F8 FFFF
04FA 0000
04FC 80FF         1210         DW      -BCOLS,-1,0
04FE FFFF
0500 0000
                  1211 ;
                  1212 ;
                  1213 INCYTB:
0502 8000         1214         DW      BCOLS,1,0           ;DELCOL>DELROW, Q0
0504 0100
0506 0000
0508 8000         1215         DW      BCOLS,1,0
050A 0100
050C 0000
050E 80FF         1216         DW      -BCOLS,-1,0
0510 FFFF
```

```
0512 0000
0514 80FF      1217      DW      -BCOLS,-1,0
0516 FFFF
0518 0000
051A 0100      1218      DW      1,0,1    ;DELROW>DELCOL, Q0
051C 0000
051E 0100
0520 FFFF      1219      DW      -1,0,-1
0522 0000
0524 FFFF
0526 FFFF      1220      DW      -1,0,-1
0528 0000
052A FFFF
052C 0100      1221      DW      1,0,1
052E 0000
0530 0100
               1222 ;
               1223 ; ANGLE TABLES FOR , FILTER
               1224 ;       RATIO, LENGTH MULT, ROWINC, COLINC
               1225 ;
               1226 RATTBL:
0532 00        1227      DB      0,16,0,16
0533 10
0534 00
0535 10
0536 03        1228      DB      3,16,3,16
0537 10
0538 03
0539 10
053A 07        1229      DB      7,17,6,15
053B 11
053C 06
053D 0F
053E 0B        1230      DB      11,19,9,13
053F 13
0540 09
0541 0D
0542 10        1231      DB      16,23,11,11
0543 17
0544 0B
0545 0B
0546 18        1232      DB      24,29,13,9
0547 1D
0548 0D
0549 09
054A 27        1233      DB      39,42,15,6
054B 2A
054C 0F
054D 06
054E 50        1234      DB      80,82,16,3
054F 52
0550 10
0551 03
0552 7F        1235      DB      127,0,16,0
0553 00
0554 10
0555 00
0556 00        1236 RATTB2: DB   0        ;END OF TABLE
               1237 ;
               1238 ;
0557 00        1239 INCTBL: DB   0
               1240 ;
               1241 ;
```

```
                1242 ;
                1243 ;
                1244 ;
                1245 ; ****************************************************************
                1246 ;
                1247 ; UTILITY SUBROUTINES
                1248 ;
                1249 ;
                1250 ;
                1251 ;
                1252 ; DIVIDE-8:  BC / D -> C, REM. B
                1253 ;
                1254 ;     GIVEN:
                1255 ;        BC -- DIVIDEND
                1256 ;        D  -- DIVISOR
                1257 ;
                1258 ;     RETURNS:
                1259 ;        B -- REMAINDER
                1260 ;        C -- QUOTIENT
                1261 ;
                1262 ;     USES:
                1263 ;        NONE CHANGED
                1264 ;
                1265 DIV8:
0558 F5         1266        PUSH    PSW
0559 D5         1267        PUSH    D
055A E5         1268        PUSH    H
055B 1E09       1269        MVI     E,9      ;INIT LOOP COUNTER
055D 78         1270        MOV     A,B
055E 47         1271 DIV80: MOV     B,A
055F 79         1272        MOV     A,C      ;ROTATE CARRY INOT C REG, ROTATE
0560 17         1273        RAL              ; NEXT MOST SIGNIFICANT BIT TO CARRY
0561 4F         1274        MOV     C,A
0562 1D         1275        DCR     E
0563 CA7005     1276        JZ      DIV81
0566 78         1277        MOV     A,B      ;ROTATE MOST SIGNIFICANT BIT TO HIGH
0567 17         1278        RAL              ; ORDER QUOTIENT
0568 92         1279        SUB     D        ;SUBTRACT DIVISOR.  IF < HIGH
0569 D25ED5     1280        JNC     DIV80    ; ORDER QUOTIENT, GO TO DIV80
056C 82         1281        ADD     D        ;OTHERWISE ADD DIVISOR BACK
056D C35ED5     1282        JMP     DIV80
                1283 ;
0570 17         1284 DIV81: RAL
0571 5F         1285        MOV     E,A
0572 3EFF       1286        MVI     A,0FFH   ;COMPLEMENT THE QUOTIENT
0574 A9         1287        XRA     C
0575 4F         1288        MOV     C,A
0576 7B         1289        MOV     A,E
0577 1F         1290        RAR
0578 E1         1291        POP     H        ;RESTORE CALLER'S REGISTERS
0579 D1         1292        POP     D
057A F1         1293        POP     PSW
057B C9         1294        RET
                1295 ;
                1296 ;
                1297 ;
                1298 ;
                1299 ; DIVIDE-16:  BC / DE -> BC, REM. DE
                1300 ;     GIVEN:
                1301 ;        BC -- DIVIDEND
                1302 ;        DE -- DIVISOR
                1303 ;
                1304 ;     RETURNS:
                1305 ;        BC -- QUOTIENT
```

```
1306 ;         DE -- REMAINDER
1307 ;
1308 ;    USES:
1309 ;         STACK TO SAVE HL,A (SCRATCH REG'S)
1310 ;
1311 DIV16:
057C F5        1312         PUSH    PSW
057D E5        1313         PUSH    H
057E 7A        1314         MOV     A,D     ;NEGATE THE DIVISOR
057F 2F        1315         CMA
0580 57        1316         MOV     D,A
0581 7B        1317         MOV     A,E
0582 2F        1318         CMA
0583 5F        1319         MOV     E,A
0584 13        1320         INX     D       ;FOR TWO'S COMPLEMENT
0585 210000    1321         LXI     H,0     ;INITIAL VALUE FOR REMAINDER
0588 3E11      1322         MVI     A,17    ;INITIALIZE LOOP COUNTER
058A E5        1323 DIV160: PUSH    H       ;SAVE REMAINDER
058B 19        1324         DAD     D       ;SUBTRACT DIVISOR (ADD NEGATIVE)
058C D29005    1325         JNC     DIV161  ;UNDER FLOW, RESTORE HL
058F E3        1326         XTHL
0590 E1        1327 DIV161: POP     H
0591 F5        1328         PUSH    PSW     ;SAVE LOOP COUNTER (A)
0592 79        1329         MOV     A,C     ;4 REGISTER LEFT SHIFT
0593 17        1330         RAL             ;WITH CARRY
0594 4F        1331         MOV     C,A     ;CY->C->B->L->H
0595 78        1332         MOV     A,B
0596 17        1333         RAL
0597 47        1334         MOV     B,A
0598 7D        1335         MOV     A,L
0599 17        1336         RAL
059A 6F        1337         MOV     L,A
059B 7C        1338         MOV     A,H
059C 17        1339         RAL
059D 67        1340         MOV     H,A
059E F1        1341         POP     PSW     ;RESTORE LOOP COUNTER (A)
059F 3D        1342         DCR     A       ;DECREMENT IT
05A0 C28A05    1343         JNZ     DIV160  ;KEEP LOOPING
               1344 ;
               1345 ;POST-DIVIDE CLEAN UP
               1346 ;SHIFT REMAINDER RIGHT AND RETURN IN DE
               1347 ;
05A3 B7        1348         ORA     A
05A4 7C        1349         MOV     A,H
05A5 1F        1350         RAR
05A6 57        1351         MOV     D,A
05A7 7D        1352         MOV     A,L
05A8 1F        1353         RAR
05A9 5F        1354         MOV     E,A
               1355 ;
05AA E1        1356         POP     H
05AB F1        1357         POP     PSW
05AC C9        1358         RET
               1359 ;
               1360 ;
               1361 ;
               1362 ;
               1363 ;
               1364 ;
               1365 ;    MULTIPLY-8:  B * C -> BC
               1366 ;
               1367 ;
05AD F5        1368 MPY8:   PUSH    PSW
05AE D5        1369         PUSH    D
05AF 50        1370         MOV     D,B
```

```
05B0 0600     1371           MVI    B,0      ;INITIALIZE MOST SIGNIFICANT BYTYE
              1372                           ; OF RESULT
05B2 1E09     1373           MVI    E,9      ;BIT COUNTER
              1374 ;
05B4 79       1375 MPY80:    MOV    A,C      ;ROTATE LEAST SIGNIFICANT BIT OF
05B5 1F       1376           RAR             ;  MULTIPLIER TO CARRY AND SHIFT
05B6 4F       1377           MOV    C,A      ;LOW-ORDER BYTE OF RESULT
05B7 1D       1378           DCR    E
05B8 CAC505   1379           JZ     MPY83    ;EXIT IF COMPLETE
05BB 78       1380           MOV    A,B
05BC D2C005   1381           JNC    MPY81
05BF 82       1382           ADD    D        ;ADD MULTIPLICAND TO HIGH-
              1383                           ;  ORDER BYTE OF RESULT IF BIT
              1384                           ;  WAS A ONE
05C0 1F       1385 MPY81:    RAR             ;CARRY=0 HERE SHIFT HIGH-
              1386                           ;ORDER BYTE OF RESULT
05C1 47       1387           MOV    B,A
05C2 C3B405   1388           JMP    MPY80
              1389 ;
05C5 D1       1390 MPY83:    POP    D
05C6 F1       1391           POP    PSW
05C7 C9       1392           RET
              1393 ;
              1394 ;
              1395 ;
              1396 ;
              1397 ;   DIVIDE-24:  E:BC / D -> BC, REM. E
              1398 ;
              1399 ;       GIVEN:
              1400 ;          E:BC -- DIVIDEND
              1401 ;          D    -- DIVISOR
              1402 ;
              1403 ;       RETURNS:
              1404 ;          BC -- QUOTIENT
              1405 ;          E  -- REMAINDER
              1406 ;
              1407 ;       ???   IGNORES MSBIT OF BC
              1408 ;        !    OVERFLOW IF RESULT > 16 BITS
              1409 ;
              1410 ;
              1411 DIV24:
05C8 F5       1412           PUSH   PSW
05C9 E5       1413           PUSH   H
              1414 ;
05CA 2E11     1415           MVI    L,17     ;LOOP COUNTER
05CC 7B       1416           MOV    A,E      ;MSB
              1417 ;
05CD 5F       1418 DIV240:   MOV    E,A      ;SAVE MSB
05CE 79       1419           MOV    A,C      ;ROTATE CY' TO BC, ROTATE DIVIDEND
05CF 17       1420           RAL
05D0 4F       1421           MOV    C,A
05D1 78       1422           MOV    A,B
05D2 17       1423           RAL
05D3 47       1424           MOV    B,A
05D4 2D       1425           DCR    L
05D5 CAE205   1426           JZ     DIV241   ;DONE
              1427 ;
05D8 7B       1428           MOV    A,E      ;ROTATE DIVIDEND LEFT <=DIVISOR RIGHT
05D9 17       1429           RAL
05DA 92       1430           SUB    D        ;TEST: CAN SUB DIVISOR
05DB D2CD05   1431           JNC    DIV240;  YES
05DE 82       1432           ADD    D        ; NO, RESTORE DIVIDEND
```

```
05DF C3CD05    1433           JMP    DIV240;CY = INVERTED QUOTIENT
               1434 ;
05E2 17        1435 DIV241:   RAL
05E3 6F        1436           MOV    L,A    ;??
05E4 79        1437           MOV    A,C
05E5 EEFF      1438           XRI    0FFH   ;INVERT QUOTIENT
05E7 4F        1439           MOV    C,A
05E8 78        1440           MOV    A,B
05E9 EEEFF     1441           XRI    0FFH
05EB 47        1442           MOV    B,A
               1443 ;
05EC 7D        1444           MOV    A,L    ;??
05ED 1F        1445           RAR
               1446 ;
05EE E1        1447           POP    H
05EF F1        1448           POP    PSW
05F0 C9        1449           RET
               1450 ;
               1451 ;
               1452           END
```

PUBLIC SYMBOLS

EXTERNAL SYMBOLS

USER SYMBOLS

| | | | | | | | | | | |
|---|---|---|---|---|---|---|---|---|---|---|
| ALG2 | A 02C0 | ALG8 | A 02DC | ANGS | A 000A | BCOL0 | A 200E | BCOL1 | A 2012 |
| BLOCK | A 0384 | CHRGRA | A 02FD | CLRP12 | A 0415 | CLRPIX | A 03F1 | CNTR | A 200A |
| CRTCMD | A 4001 | CRTDAT | A 6000 | CRTINI | A 4000 | CRTINT | A 4000 | CRTSTA | A 4001 |
| CUROFF | A 0030 | CURON | A 0031 | DATEND | A 26C0 | DATSTK | A 2000 | DATTOP | A 2700 |
| DELX | A 201F | DELY | A 2021 | DEV | A FFFA | DISINT | A 009F | DISLP | A 0022 |
| DIV16 | A 057C | DIV160 | A 058A | DIV161 | A 0590 | DIV24 | A 05C8 | DIV240 | A 05CD |
| DIV80 | A 055E | DIV81 | A 0570 | DRAW | A 01C2 | DRAW2 | A 01ED | DRAW4 | A 0206 |
| DSPOFF | A 0028 | DSPON | A 0029 | ENBLP | A 0023 | ENBLPI | A 0061 | ENDDAT | A 018E |
| GETDAT | A 03A7 | GETHIT | A 0449 | GETRC | A 0434 | HITAD0 | A 2014 | HITADI | A 2016 |
| INCCUR | A 00A9 | INCTBL | A 0557 | INCX | A 2023 | INCXTB | A 04D2 | INCY | A 2025 |
| INICRT | A 0347 | INITB0 | A 04B1 | INITB1 | A 04BC | INITB2 | A 04C7 | LAST | A 2006 |
| LPACT | A 0000 | LPADH | A 4007 | LPADL | A 4006 | LPAVG | A 00AF | LPBIT | A 0001 |
| LPTES1 | A 0494 | LPTEST | A 0491 | LPWAI2 | A 00A8 | LPWAIT | A 0094 | MASRST | A 0000 |
| MINCOL | A 0001 | MINROW | A 0001 | MPY8 | A 05AD | MPY80 | A 05B4 | MPY81 | A 05C0 |
| NXTDA2 | A 0119 | NXTDA3 | A 0141 | NXTDA4 | A 0152 | NXTDA5 | A 017A | NXTDA6 | A 018B |
| OCT2 | A 028D | PIXDAT | A 5000 | PIXEL | A 00FE | PIXOFF | A FFF7 | PNTADH | A 4007 |
| RAM | A 0000 | RATTB2 | A 0556 | RATTBL | A 0532 | RDCUR | A 00AC | RDCURI | A 00AD |
| READY | A 039C | READY2 | A 039D | RLHL | A 045F | ROW0 | A 200C | ROW1 | A 2010 |
| RRHL | A 0478 | RSTB5 | A 0334 | RSTISR | A 005F | SCNOFF | A 2008 | SCRSTL | A 4002 |
| SRCSTH | A 4003 | START | A 003E | STKTOP | A 2800 | SUM | A 2003 | TIMOUT | A 0001 |
| WRCURI | A 00AB | WRPNT | A 00A2 | | | | | | |

ASSEMBLY COMPLETE, NO ERRORS

What is claimed is:

1. A method for personal identification, comprising the following steps:
   (a) providing a display device for use in recording of identification indicia;
   (b) providing recording means which includes high resolution means for receiving positional data from a display device;
   (c) recording a unique pattern of personal identification data remotely from said display device on a separate element and subsequently recording by placing said element on said display device and tracing the path of the recording with said recording means, said recording means picking up high-resolution positional data from said display device during said movement; and
   (d) storing said high resolution positional data for reference.

2. The method of claim 1 in which said element is a one-time carbon ribbon on which a substantially transparent negative image of the unique pattern is produced by said remote initial recording.

3. A method for personal identification, comprising the following steps:

(a) providing a display device for use in recording of identification data;

(b) providing a recording instrument for receiving positional data from said display device;

(c) moving said recording instrument over said display device in a unique pattern;

(d) providing both coarse and fine positional information representing the position of the recording instrument as it is moved with respect to the display device;

(e) combining corresponding coarse and fine positional information to provide precise positional information;

(f) averaging a plurality of items of precise positional information which have been generated with the recording instrument in a single position to produce a single averaged item of positional information;

(g) collecting and compressing a plurality of said averaged items of positional information to provide a mathematical representation of movement of the recording instrument with respect to the display device; and (h) storing said compressed plurality of averaged items of positional information to provide a reference by which the person moving the recording instrument with respect to the display device may be identified.

4. The method of claim 3, in which the step of combining corresponding coarse and fine positional information includes the step of decrementing the penultimate denomination of the coarse positional information when the value of the fine information is less than the low order value of the coarse information, and also includes the step of substituting the fine positional information for the low order of the coarse positional information.

5. The method of claim 3, also including the step of testing each item of precise positional information in accordance with pre-established criteria in order to determine its acceptability, and discarding each such item which is found to be unacceptable.

6. Personal identification apparatus comprising:
display means in which a controllable repetitive pattern of illumination is produced on a screen;
detection means capable of detecting said illumination when brought into proximity to said screen by a strobe signal generated at predetermined times;
controller means for controlling the generation of said pattern on the screen of the display means, coupled to the detection means to receive said strobe signal for providing coarse positional information as to the location of the detection means on the screen;
high resolution counting means controlled by said controller means and coupled to the detection means to receive said strobe signal for providing fine positional information so as to the location of the detection means on the screen; and
data processing means for combining the coarse and fine positional information to provide precise positional information as to the location of the detection means on the screen, said data processing means also averaging a plurality of items of positional information generated with said detection means in a single position in order to provide a single averaged datum for that position.

7. The personal identification apparatus of claim 6 in which the averaged data is collected and compressed to provide a mathematical representation of movement of the detection means with respect to the screen.

8. The personal identification apparatus of claim 7 in which the mathematical representation of movement of the detection means is in the form of a series of connected vectors.

9. The personal identification apparatus of claim 7, also including means for storing said mathematical representation for future reference and comparison purposes.

10. The personal identification apparatus of claim 6, also including means for generating indicia on said screen corresponding to the movement of the detection means thereon.

11. The personal identification apparatus of claim 6, in which the high-resolution counting means includes counter means driven by the controller means and latch means coupled to the counter means and controlled by the strobe signal of the detection means for maintaining a count representing the position of the detection means on the screen at the time of the strobe.

12. The personal identification apparatus of claim 11 in which the high resolution counting means also includes means controlled by the controller means for resetting the counter means at the end of each character position.

* * * * *